(12) United States Patent
Ha et al.

(10) Patent No.: US 11,405,496 B2
(45) Date of Patent: Aug. 2, 2022

(54) ELECTRONIC DEVICE INCLUDING ROTATION CAMERA

(71) Applicant: SAMSUNG ELECTRONICS CO., LTD., Suwon-si (KR)

(72) Inventors: Dohyung Ha, Suwon-si (KR); Wonseok Oh, Suwon-si (KR); Saewon Kwon, Suwon-si (KR); Kisung Kim, Suwon-si (KR); Sangkyu Park, Suwon-si (KR); Junghyuck Im, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 16/918,360

(22) Filed: Jul. 1, 2020

(65) Prior Publication Data

US 2021/0006646 A1 Jan. 7, 2021

(30) Foreign Application Priority Data

Jul. 2, 2019 (KR) .................. 10-2019-0079363

(51) Int. Cl.
*H04M 1/02* (2006.01)

(52) U.S. Cl.
CPC ....... *H04M 1/0264* (2013.01); *H04M 1/0237* (2013.01); *H04M 2250/20* (2013.01)

(58) Field of Classification Search
CPC ........... H04M 2250/20; H04M 1/0214; H04M 1/0235; H04M 2250/12; H04M 1/0247; H04M 1/0246; H04M 1/0245; H04M 1/0202; H04M 1/21; H04M 1/72403
See application file for complete search history.

(56) References Cited

U.S. PATENT DOCUMENTS

| | | | |
|---|---|---|---|
| 7,632,025 B2 | 12/2009 | Sung et al. | |
| 9,288,471 B1 * | 3/2016 | Yang | G06F 3/017 |
| 11,196,848 B2 * | 12/2021 | Zeng | H04N 5/2253 |

(Continued)

FOREIGN PATENT DOCUMENTS

| | | | | |
|---|---|---|---|---|
| EP | 1542435 A1 * | 6/2005 | .......... | H04M 1/0245 |
| EP | 1744521 A1 * | 1/2007 | .......... | H04M 1/0264 |

(Continued)

OTHER PUBLICATIONS

International Search Report and Written Opinion dated Oct. 16, 2020 in corresponding Application No. PCT/KR2020/008632.

*Primary Examiner* — Quoc D Tran
(74) *Attorney, Agent, or Firm* — Nixon & Vanderhye P.C.

(57) ABSTRACT

An electronic device includes a front part, a rear part including an opening, a camera module disposed in the opening and configured to rotate depending on a slide operation of the front part. The front part is configured to slide between a first position in which the front part and the rear part are aligned, a second position in which portion of the opening is exposed in a direction toward a front surface of the front part, or a third position in which the opening is exposed in the direction toward the front surface of the front part. The camera module is configured to face a direction away from a rear surface of the front part based on the front part being in the first position and to face the direction toward the front surface of the front part based on the front part being in the third position.

20 Claims, 22 Drawing Sheets

(56) References Cited

U.S. PATENT DOCUMENTS

| | | | |
|---|---|---|---|
| 2005/0049019 A1 | 3/2005 | Lee | |
| 2005/0124398 A1 | 6/2005 | Lee et al. | |
| 2006/0197863 A1* | 9/2006 | Kim | H04M 1/0264 348/335 |
| 2007/0013555 A1 | 1/2007 | Sung et al. | |
| 2008/0153558 A1* | 6/2008 | Mifune | H04M 1/0237 455/575.4 |
| 2015/0005031 A1* | 1/2015 | Sheu | H04N 5/2259 455/556.1 |
| 2015/0109475 A1* | 4/2015 | Matilainen | H04N 5/2257 348/222.1 |
| 2015/0377323 A1* | 12/2015 | Koike | F16H 57/0006 475/149 |
| 2018/0307269 A1 | 10/2018 | Pantel | |
| 2018/0307270 A1 | 10/2018 | Pantel | |
| 2019/0394374 A1* | 12/2019 | Zhang | G06F 1/1622 |
| 2020/0177773 A1* | 6/2020 | Yoo | H04M 1/0264 |
| 2020/0329131 A1* | 10/2020 | Han | H04M 1/0264 |
| 2020/0412853 A1* | 12/2020 | Zhu | H04M 1/72412 |

FOREIGN PATENT DOCUMENTS

| | | |
|---|---|---|
| KR | 10-0543794 | 1/2006 |
| KR | 10-0560885 | 3/2006 |
| KR | 10-2008-0092536 | 10/2008 |

\* cited by examiner

<311>

<312>

<313>

<314>

<315>

<316>

<411>

<412>

<413>

<414>

<415>

<416>

ELECTRONIC DEVICE INCLUDING ROTATION CAMERA

CROSS-REFERENCE TO RELATED APPLICATION

This application is based on and claims priority under 35 U.S.C. § 119 to Korean Patent Application No. 10-2019-0079363, filed on Jul. 2, 2019, in the Korean Intellectual Property Office, the disclosure of which is incorporated by reference herein its entirety.

BACKGROUND

1. Field

The disclosure relates to a camera technology used in an electronic device.

2. Description of Related Art

Recently, electronic devices (such as digital cameras, digital camcorders, or smartphones) that include cameras have been widely used. The electronic devices including the cameras may provide photographing functions. For example, an electronic device may output a preview image obtained from a camera on a display and may obtain a captured image from the camera as a shutter operates.

The electronic device may include a plurality of cameras (e.g., at least one front camera and at least one rear camera). However, when a camera is disposed on a front surface of the electronic device, the display of the electronic device cannot use a maximum area of the front surface of the electronic device.

The above information is presented as background information only to assist with an understanding of the disclosure. No determination has been made, and no assertion is made, as to whether any of the above might be applicable as prior art with regard to the disclosure.

SUMMARY

Embodiments of the disclosure address at least the above-mentioned problems and/or disadvantages and to provide at least the advantages described below. Accordingly, an embodiment of the disclosure provides an electronic device capable of using one camera module as both a front camera and a rear camera.

In accordance with an example embodiment of the disclosure, an electronic device includes: a front part including a display, a rear part disposed to face a rear surface of the front part and including an opening, at least portion of the opening is exposed in a direction opposite to a front surface of the front part, a camera module including at least one camera disposed in the opening and configured to rotate depending on a slide operation of the front part. The front part is configured to slide between a first position in which the front part and the rear part are aligned with each other, a second position in which part of the opening is exposed in a direction toward the front surface of the front part, or a third position in which the opening is exposed in the direction toward the front surface of the front part. The rear part includes an inner slide part configured to integrally move with the front part based on the front part moving between the second position and the third position and a support configured to apply a specified force to the inner slide part based on the front part moving between the second position and the third position. The camera module is configured to face a direction away from the rear surface of the front part based on the front part being in the first position and to face the direction toward the front surface of the front part based on the front part being in the third position.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

With regard to description of the drawings, identical or similar reference numerals may be used to refer to identical or similar components.

DETAILED DESCRIPTION

Hereinafter, various example embodiments of the disclosure may be described in greater detail with reference to accompanying drawings. Accordingly, those of ordinary skill in the art will recognize that various modifications, equivalents, and/or alternatives on the various example embodiments described herein can be variously made without departing from the scope and spirit of the disclosure.

Figure 1A:
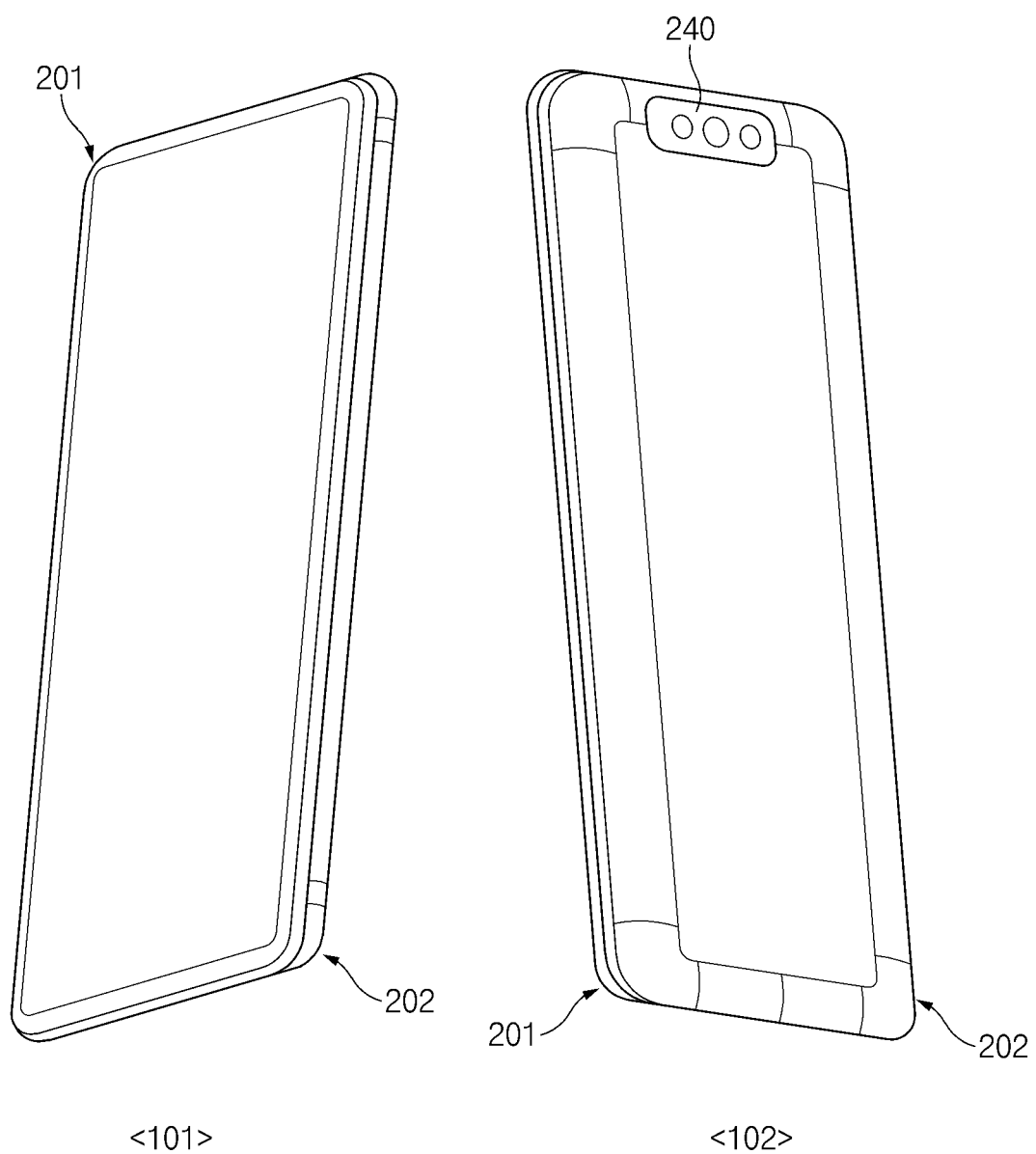
FIG. 1A is a front and rear perspective view illustrating an initial state of an example electronic device according to an embodiment.
Figure 1B:
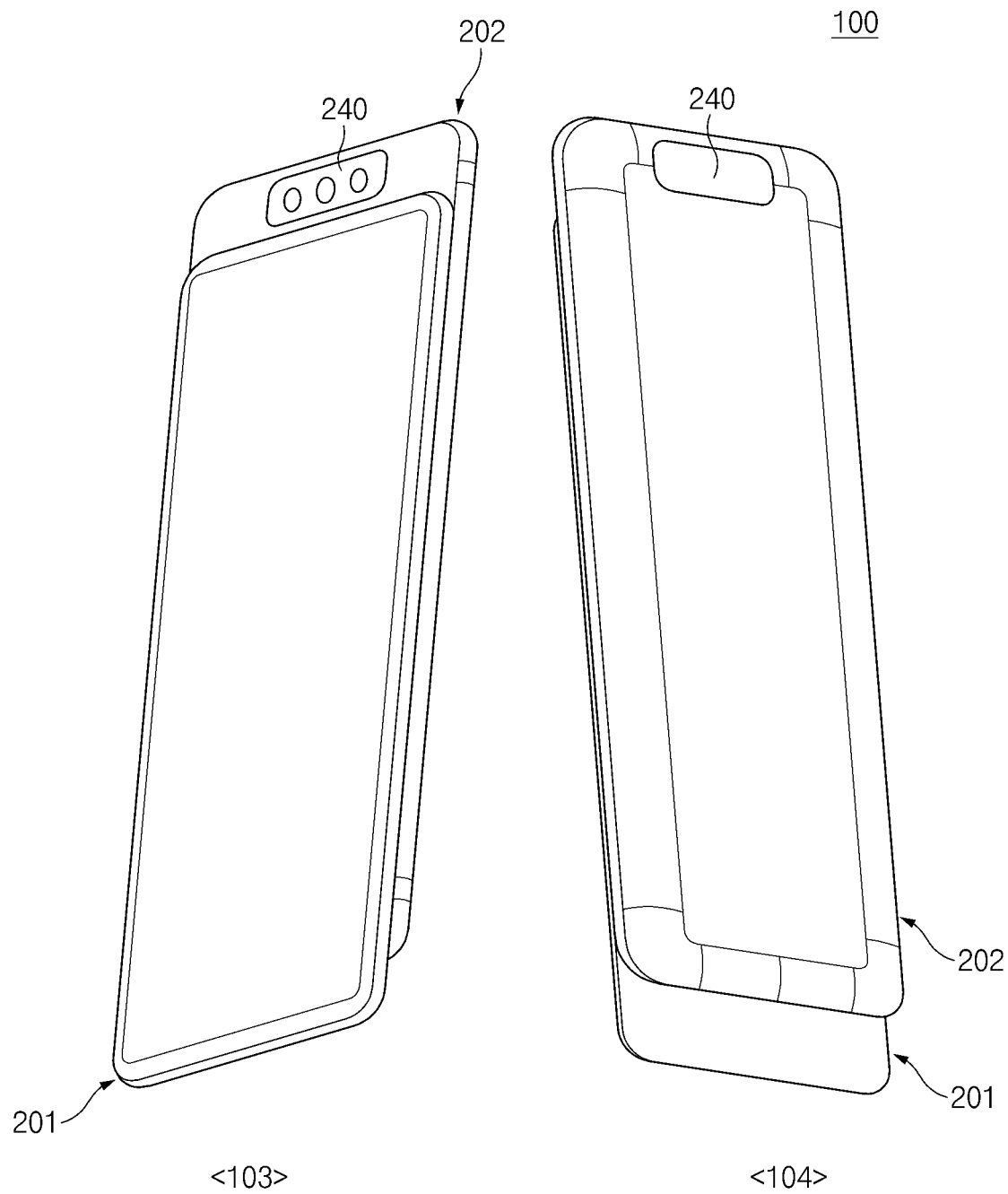
FIG. 1B is a front and rear perspective view illustrating a slide-completed state of the electronic device according to an embodiment.

FIG. 1A is a front and rear perspective view illustrating an initial state (e.g., a first state) of an example electronic device according to an embodiment. FIG. 1B is a front and rear perspective view illustrating a slide-completed state (e.g., a second state) of the electronic device according to an embodiment.

Referring to FIGS. 1A and 1B, the electronic device 100 may include a front part 201 and a rear part 202. The front part 201 may be disposed to face one surface of the rear part 202. The front part 201 may slide in a state of facing the rear part 202. In FIG. 1A, 101 and 102 represent a state (e.g., the initial state or the initial position) before the front part 201 slides, 101 is a perspective view from the front of the electronic device 100, and 102 is a perspective view from the rear of the electronic device. In FIG. 1B, 103 and 104 represent a state (e.g., the slide-completed state or the slide-completed position) after the front part 201 slides, 103 is a perspective view from the front of the electronic device 100, and 104 is a perspective view from the rear of the electronic device. According to various embodiments, depending on a point of view, the rear part 202 may be described as sliding relative to the front part 201. Hereinafter, the front part 201 will be described as sliding relative to the rear part 202.

According to an embodiment, when the front part 201 is in the initial state, a camera included in a camera module 240 may face a first direction (e.g., a direction away from the rear of the electronic device 100). When the front part 201 is in the slide-completed state, the camera included in the camera module 240 may face a second direction (e.g., a direction toward the front of the electronic device 100 or a direction that a display 210 faces). According to various embodiments, the front part 201 may reciprocate between the initial position and the slide-completed position. The front part 201 may be slid by an external force (e.g., a user operation).

Figure 2A:
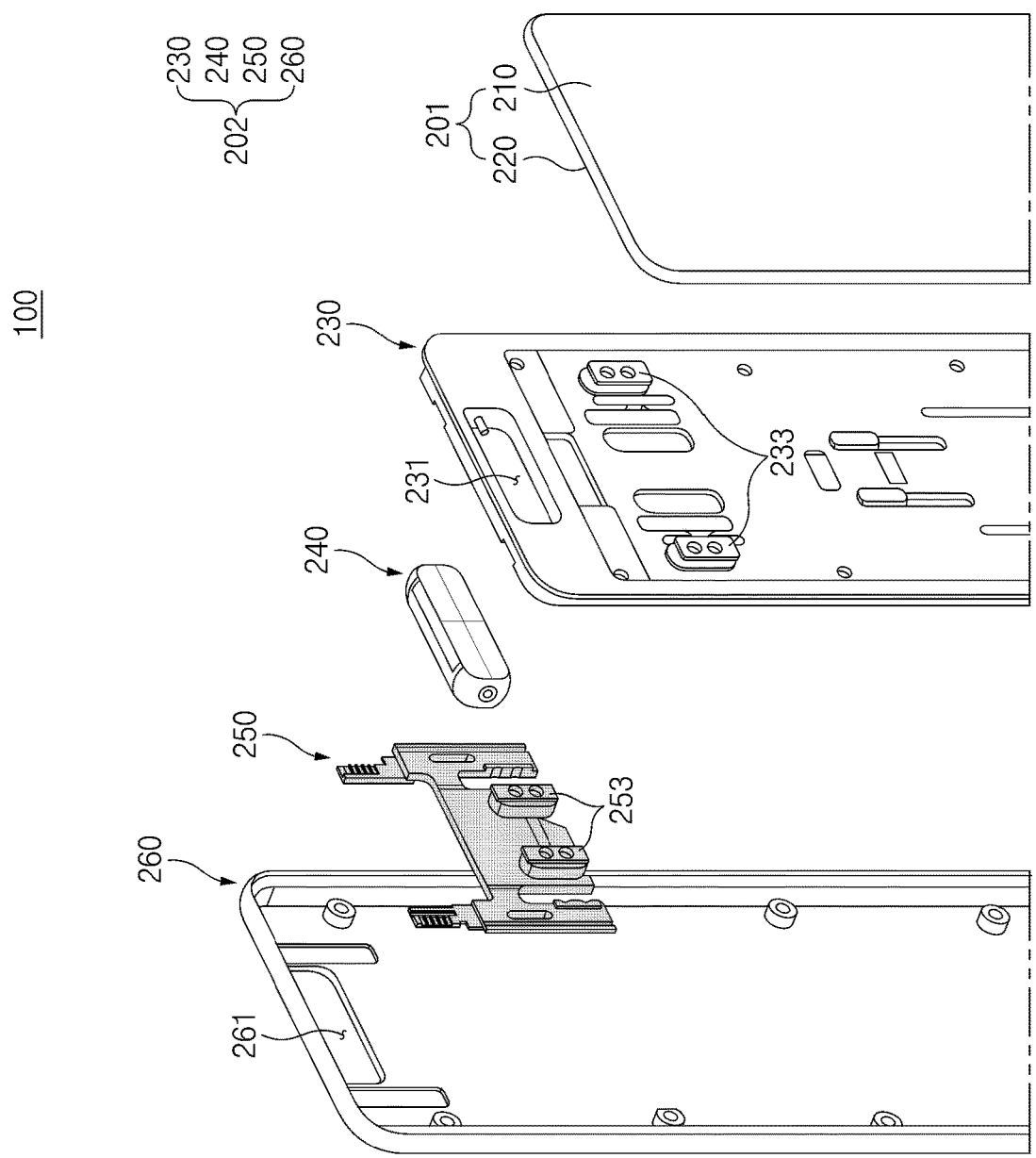
FIG. 2A is an exploded front perspective view of the electronic device according to an embodiment.
Figure 2B:
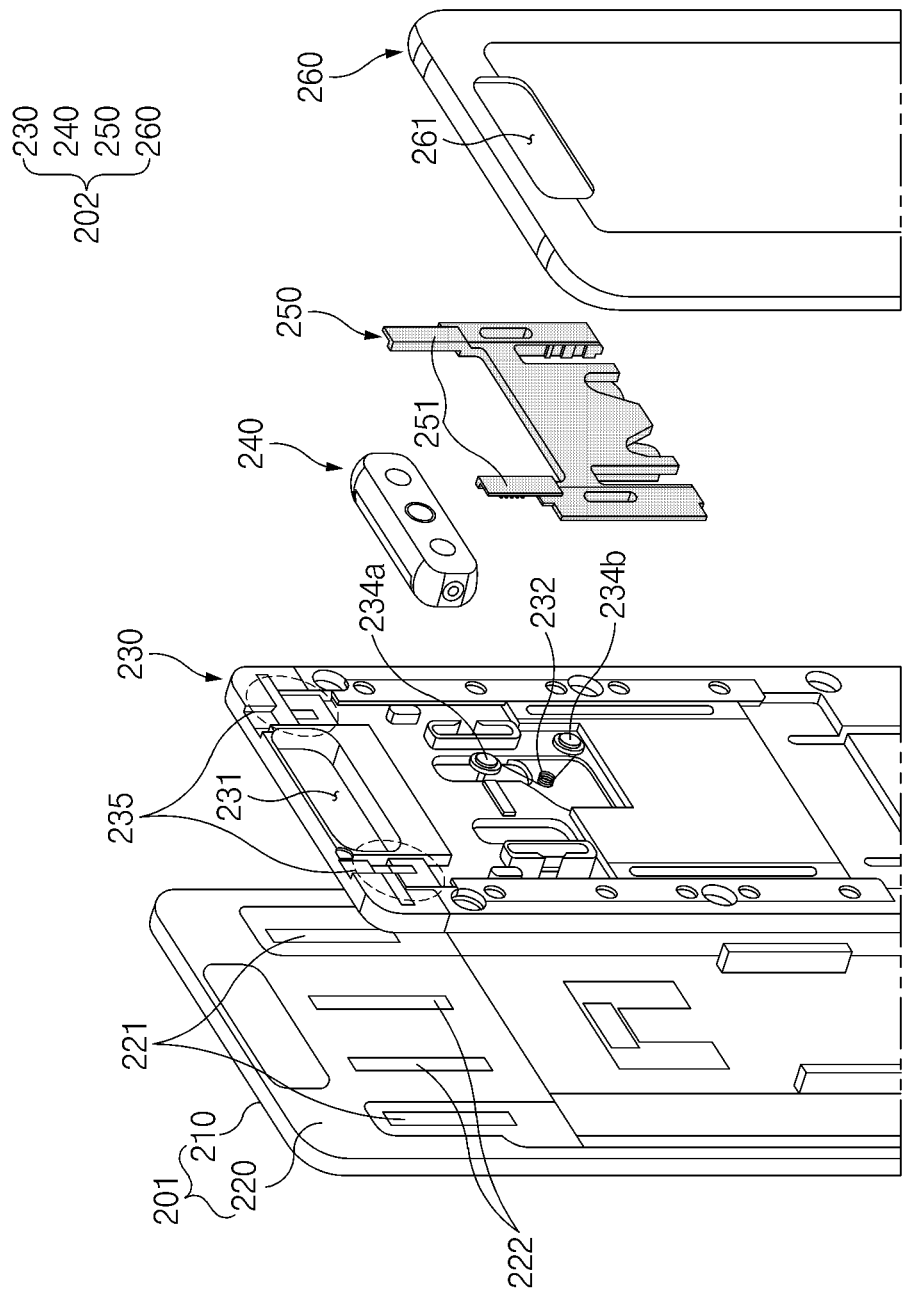
FIG. 2B is an exploded rear perspective view of the electronic device according to an embodiment.

FIG. 2A is an exploded front perspective view of the electronic device according to an embodiment. FIG. 2B is an rear exploded perspective view from another side of the electronic device according to an embodiment.

Referring to FIGS. 2A and 2B, the front part 201 may include the display 210 and a first body 220 (e.g., a front case). The rear part 202 may include a second body 230 (e.g., a rear case), the camera module 240, an inner slide part 250, and a back cover 260. In some embodiments, the electronic device 100 may further include one or more other components.

According to an embodiment, the first body 220 may slide in a state of facing one surface of the second body 230. For example, the first body 220 may include at least one first guide groove 221 and at least one second guide groove 222. The second body 230 may include at least one first guide member 233. The inner slide part 250 may include at least one second guide member 253. The first body 220 may slide based on connection of the first guide groove 221 and the first guide member 233. Furthermore, the first body 220 may slide based on connection of the second guide groove 222 and the second guide member 253.

According to an embodiment, the camera module 240 may be disposed in an opening 231 of the second body 230 and may rotate in the opening 231. For example, the second body 230 may include a double gear structure 235. The double gear structure 235 may include a plurality of pinion gears. The inner slide part 250 may include a rack gear 251. One of the plurality of pinion gears may rotate by being engaged with the rack gear 251. The rack gear 251 may perform linear motion depending on the inner slide part 250. The plurality of pinion gears may convert the linear motion of the rack gear 251 into rotary motion. The camera module 240 may be connected to a rotary shaft of another one of the plurality of pinion gears. Accordingly, when the inner slide part 250 linearly moves, the camera module 240 may rotate. According to various embodiments, the radius of rotation of the camera module 240 may be determined depending on the length of the rack gear 251, the gear ratio between the rack gear 251 and one of the plurality of pinion gears, or the gear ratio between the plurality of pinion gears.

According to an embodiment, the camera module 240 may include at least one camera device, a flash, or a sensor module. For example, the at least one camera device may include one or more lenses, an image sensor, and/or an image signal processor. The flash may include a light emitting diode or a xenon lamp. The sensor module may generate an electrical signal or a data value that corresponds to an operational state inside the electronic device 100 or an external environmental state. For example, the sensor module may include a proximity sensor, an illuminance sensor, and an HRM sensor. According to various embodiments, the camera module 240 may include a plurality of hardware device components and may include a housing containing the device components.

According to an embodiment, the back cover 260 may include an opening 261. For example, when the camera included in the camera module 240 faces toward the rear of the electronic device 100, the camera included in the camera module 240 may be exposed to the outside through the opening 261.

According to an embodiment, the inner slide part 250 may slide in a specific section inside the second body 230. For example, the inner slide part 250 may include the second guide member 253. The second guide member 253 may move within a range of the second guide groove 222 of the first body 220. An operation range of the inner slide part 250 may be determined through an operation range of the second guide member 253 by the second guide groove 222.

Figure 3A:
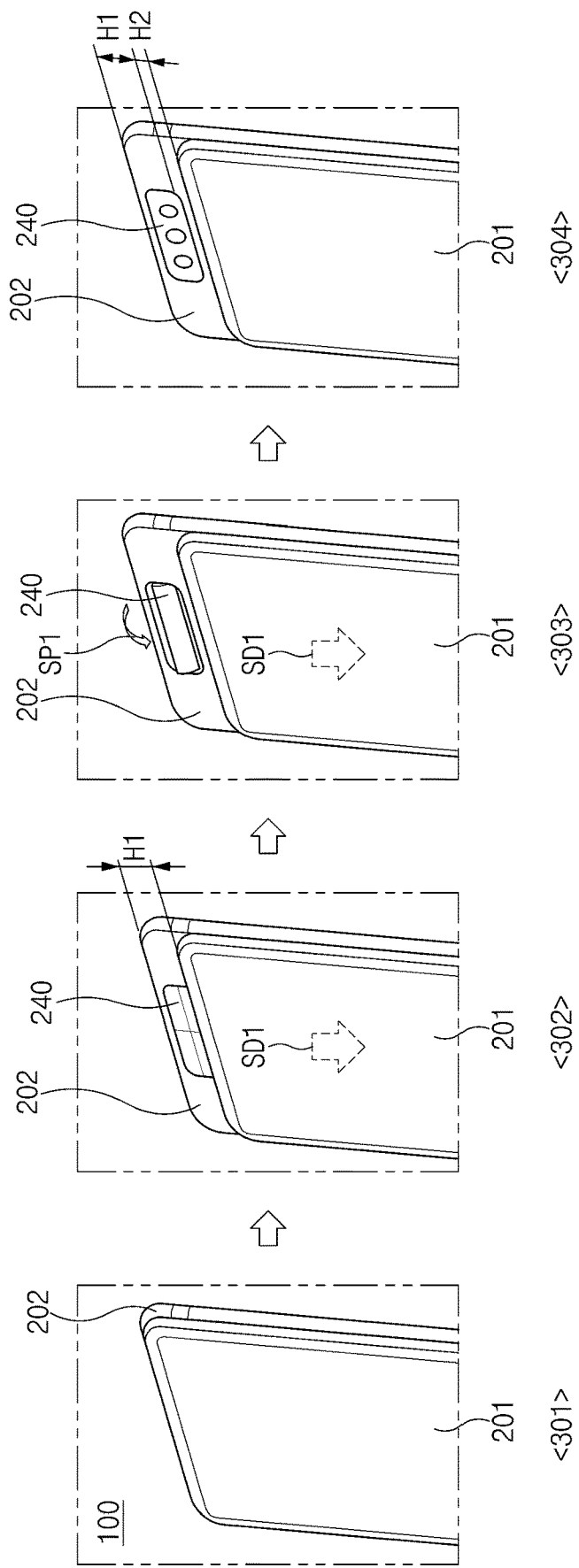
FIG. 3A is a diagram illustrating an example slide operation performed by a front part in a first slide direction (e.g., a direction in which the front part moves downward) according to an embodiment.
Figure 3B:
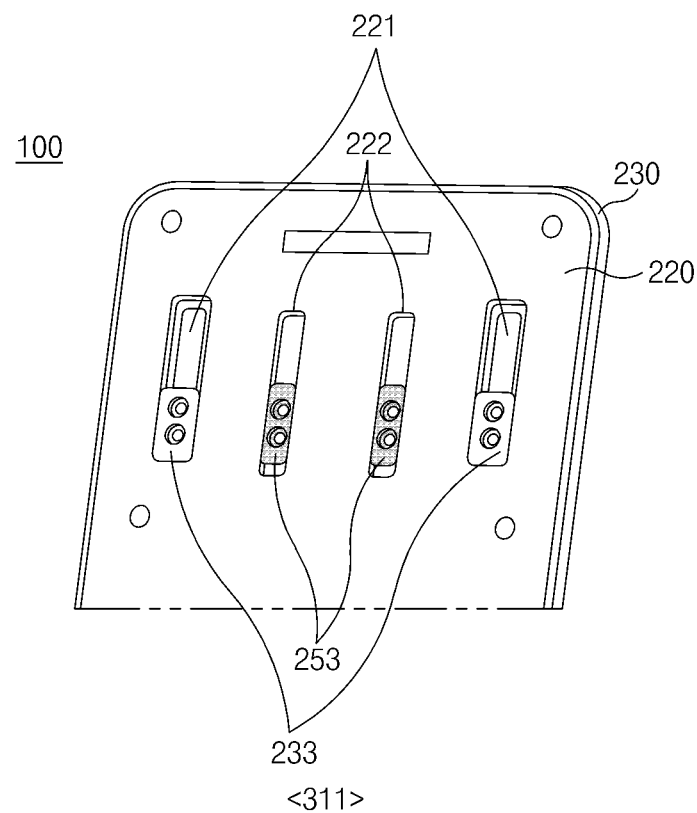
FIG. 3B is a diagram illustrating the interior of the electronic device based on the front part being located in a first position when performing the slide operation in the first slide direction according to an embodiment.
Figure 3B:
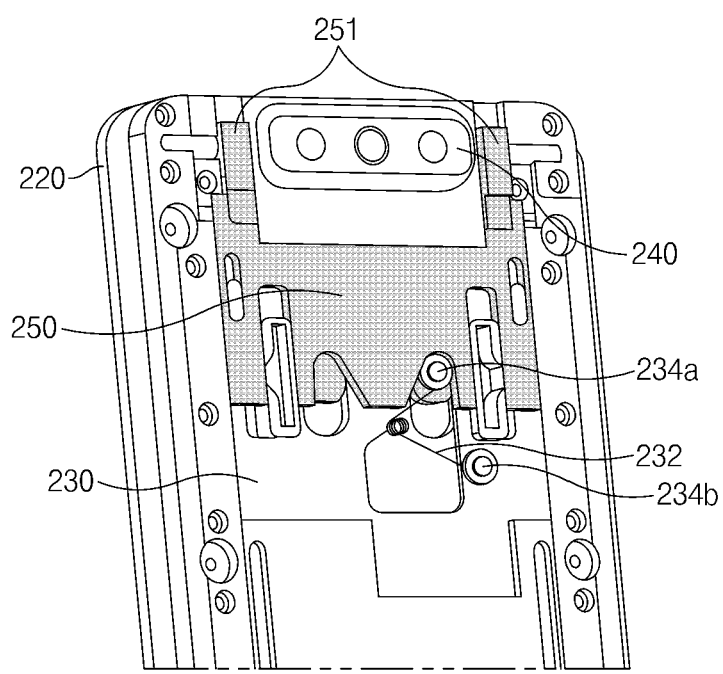
Figure 3C:
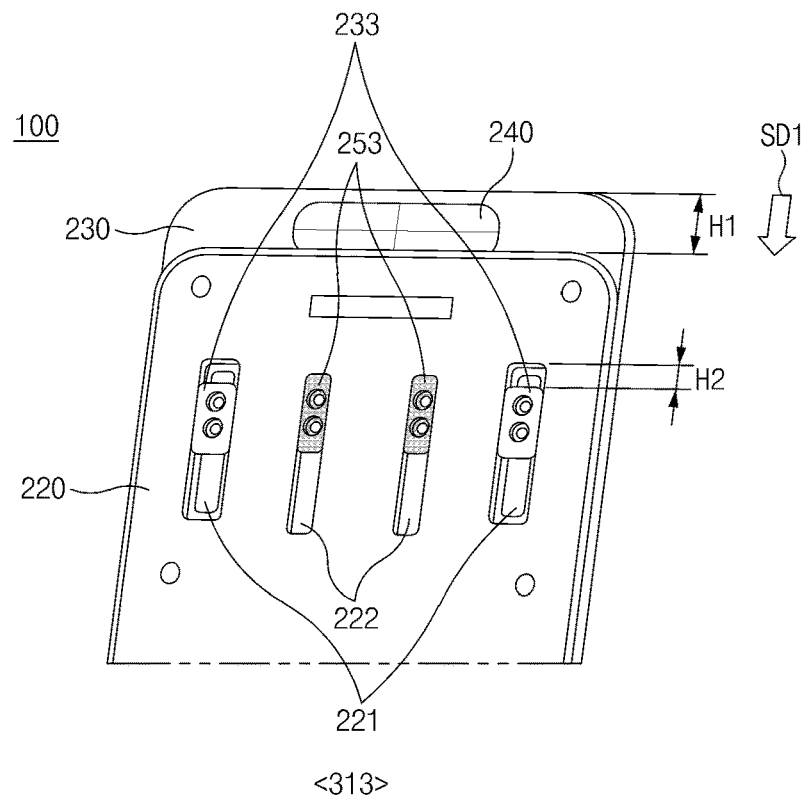
FIG. 3C is a diagram illustrating the interior of the electronic device based on the front part being located in a second position when performing the slide operation in the first slide direction according to an embodiment.
Figure 3C:
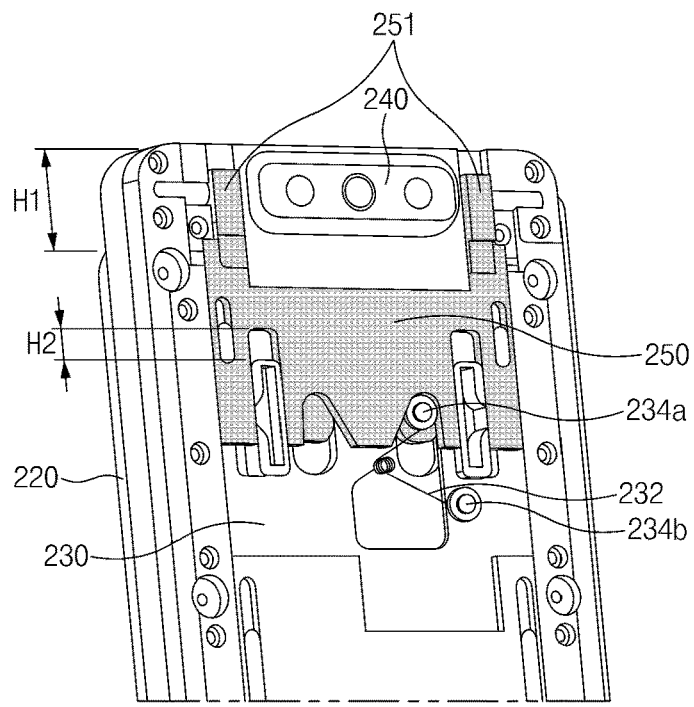
Figure 3D:
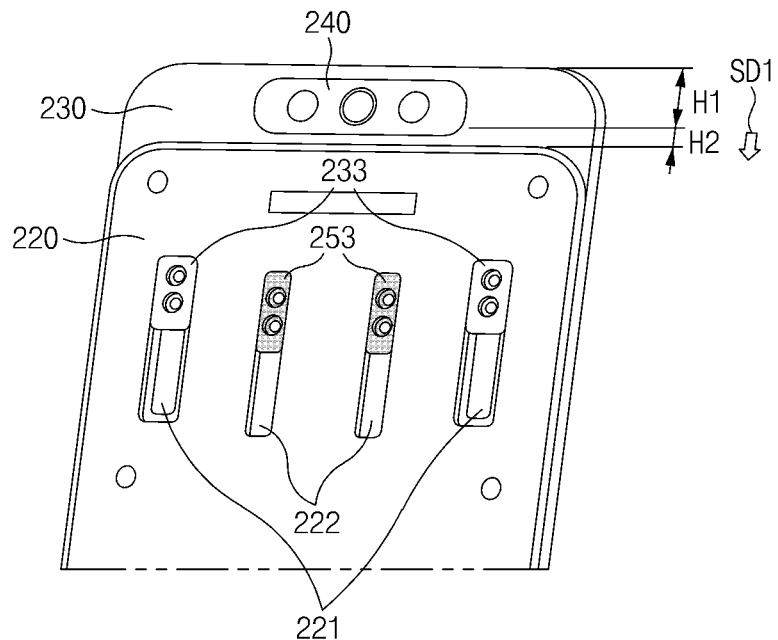
FIG. 3D is a diagram illustrating the interior of the electronic device based on the front part being located in a third position when performing the slide operation in the first slide direction according to an embodiment.
Figure 3D:
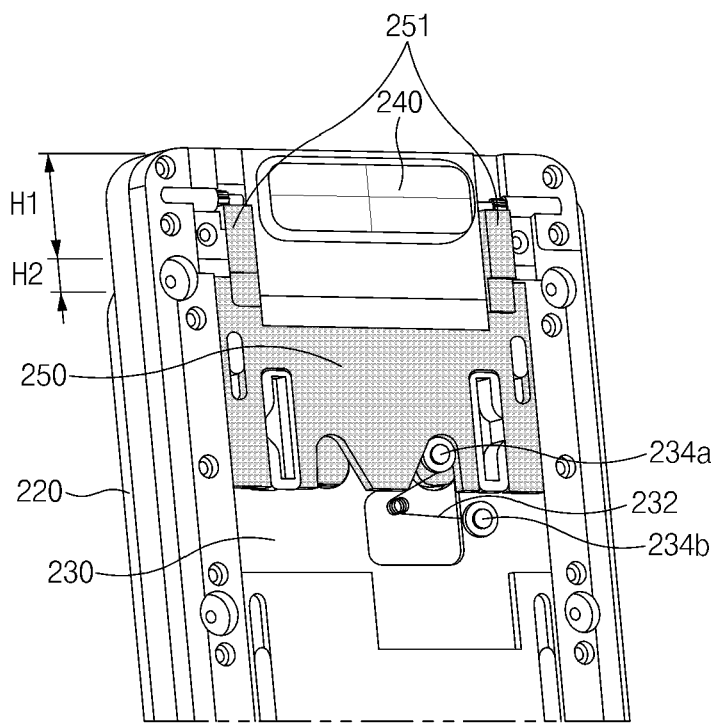

FIG. 3A is a diagram illustrating an example slide operation performed by the front part in a first slide direction SD1 (e.g., a direction in which the front part moves downward) according to an embodiment. FIG. 3B is a diagram illustrating the interior of the electronic device based on the front part being located in a first position when performing the slide operation in the first slide direction SD1 according to an embodiment. FIG. 3C is a diagram illustrating the interior of the electronic device based on the front part being located in a second position when performing the slide operation in the first slide direction SD1 according to an embodiment. FIG. 3D is a diagram illustrating the interior of the electronic device based on the front part being located in a third position when performing the slide operation in the first slide direction SD1 according to an embodiment.

Referring to FIG. 3A, the front part 201 of the electronic device 100 may perform the slide operation in the first slide direction SD1 through four steps 301, 302, 303, and 304. For example, in the first step 301, the front part 201 may be located in the first position (e.g., the initial position). In the first position, an upper end of the front part 201 may be aligned with an upper end of the rear part 202. In the first step 301, the camera included in the camera module 240 may face the first direction (e.g., the direction away from the rear of the electronic device 100). In the second step 302, the front part 201 may slide to the second position (e.g., the position spaced apart from the upper end of the rear part 202 by a first distance H1 in the first slide direction SD1). In the second step 302, the camera included in the camera module 240 may continue to maintain the first direction. In the third step 303, the front part 201 may slide from the second position to the third position (e.g., the position spaced apart from the slide-completed position or the second position by a second distance H2 in the first slide direction SD1). In the third step 303, the camera included in the camera module 240 may rotate in a first rotational direction SP1. In the fourth step 304, the front part 201 may stop at the third position. In the fourth step 304, the camera included in the camera module 240 may face the second direction (e.g., the direction toward the front of the electronic device 100).

Referring to FIGS. 3B, 3C and 3D, 311, 313, and 315 are views of the first body 220 when viewed from the front of the electronic device 100, where a display (e.g., the display 210) is omitted. 312, 314, and 316 are views of the second body 230 when viewed from the rear of the electronic device 100, where a back cover (e.g., the back cover 260) is omitted.

According to an embodiment, in 311 and 312 (e.g., the first step 301), the first body 220 may be located in the first position (e.g., the initial position). For example, an upper end of the first body 220 may be aligned with an upper end of the second body 230. The first guide member 233 may be located in a first guide position (e.g., a position aligned with a lower end of the first guide groove 221). The second guide member 253 may be located in a second guide position (e.g., a lower end portion of the second guide groove 222). The inner slide part 250 may be located in a first slide position (e.g., an initial slide position). The camera included in the camera module 240 may face the first direction (e.g., the direction away from the rear of the electronic device 100). According to various embodiments, a support member 232 may represent a first support state (e.g., an initial support state). For example, the support member 232 may apply a force to the inner slide part 250 in the second direction (e.g., a direction toward an upper portion of the electronic device 100) by using elasticity or magnetism. The support member 232 may be fixed to a first fixing member 234a and a second fixing member 234b. The first fixing member 234a may be coupled to the inner slide part 250. The second fixing member 234b may be coupled to the second body 230.

According to an embodiment, in 313 and 314 (e.g., the second step 302), the first body 220 may slide to the second position (e.g., the position spaced apart from the upper end of the second body 230 by the first distance H1 in the first slide direction SD1). For example, the first guide member 233 may be located in a third guide position (e.g., a position spaced apart from an upper end of the first guide groove 221 by the second distance H2). The second guide member 253 may be located in a fourth guide position (e.g., a position aligned with an upper end of the second guide groove 222). The inner slide part 250 may continue to maintain the first slide position without a movement. The camera included in the camera module 240 may continue to maintain the first direction. According to various embodiments, the support member 232 may continue to maintain the first support state.

According to an embodiment, in 315 and 316 (e.g., the third step 303 and the fourth step 304), the first body 220 may slide from the second position to the third position (e.g., the position spaced apart from the slide-completed position or the second position by the second distance H2 in the first slide direction SD1). For example, the first guide member 233 may be located in a fifth guide position (e.g., a position aligned with the upper end of the first guide groove 221). While the first body 220 slides from the second position to the third position, the second guide member 253 may be integrally moved with the first body 220 by the second distance H2. When the second guide member 253 moves, the inner slide part 250 coupled to the second guide member 253 may slide from the first slide position by the second distance H2 to move to a second slide position. When the inner slide part 250 slides from the first slide position to the second slide position, the rack gear 251 may move in the first slide direction SD1 by the second distance H2, and the double gear structure engaged with the rack gear 251 may rotate. Depending on the rotation of the double gear structure, the camera module 240 may rotate in the first rotational direction SP1. When the inner slide part 250 stops at the first slide position (e.g., when the first body 220 stops at the third position), the camera included in the camera module 240 may face the second direction (e.g., the direction toward the front of the electronic device 100). According to various embodiments, the support member 232 may be changed from the first support state to a second support state depending on the slide operation of the inner slide part 250. In the second support state, the support member 232 may apply a larger force to the inner slide part 250 than in the first support state.

Figure 4A:
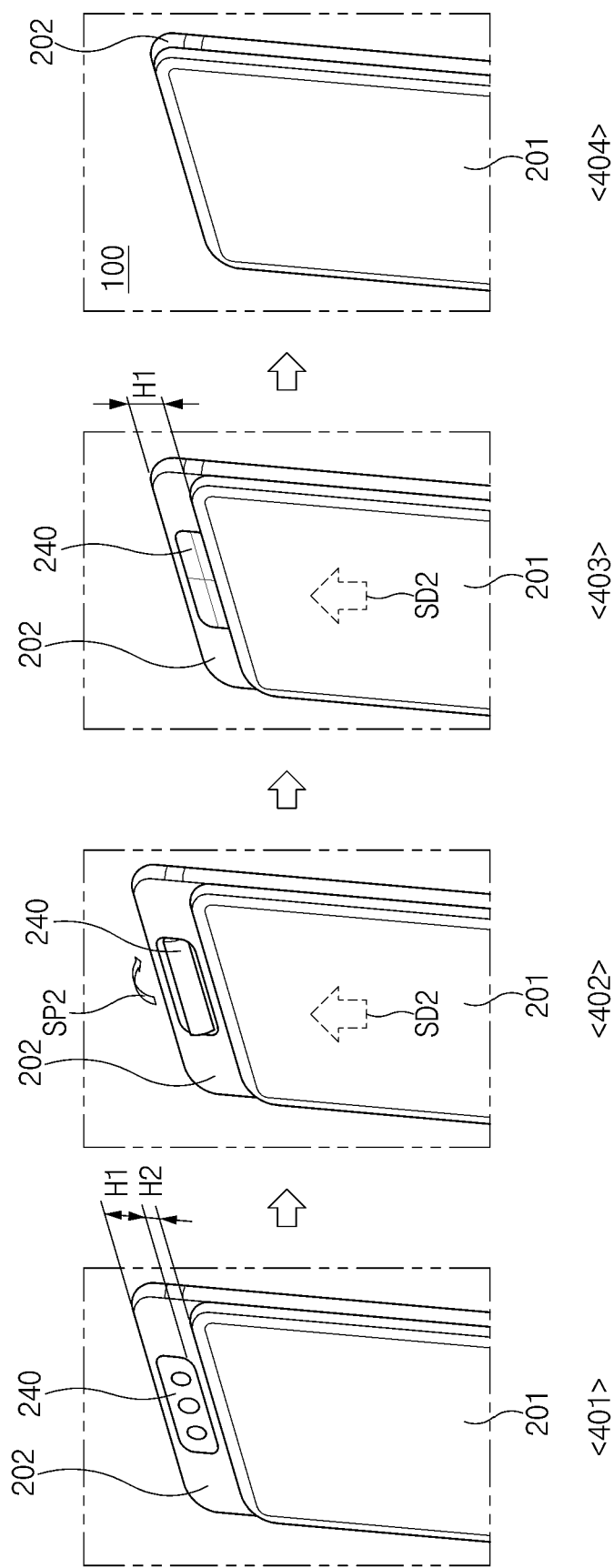
FIG. 4A is a diagram illustrating an example slide operation performed by the front part in a second slide direction (e.g., a direction in which the front part moves upward) according to an embodiment.
Figure 4B:
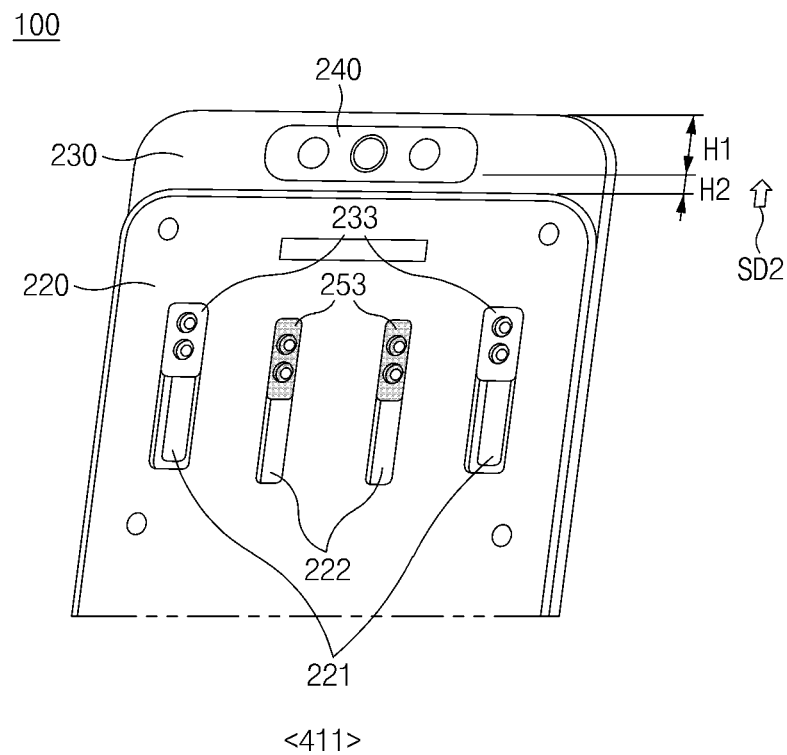
FIG. 4B is a diagram illustrating the interior of the electronic device based on the front part being located in the third position when performing the slide operation in the second slide direction according to an embodiment.
Figure 4B:
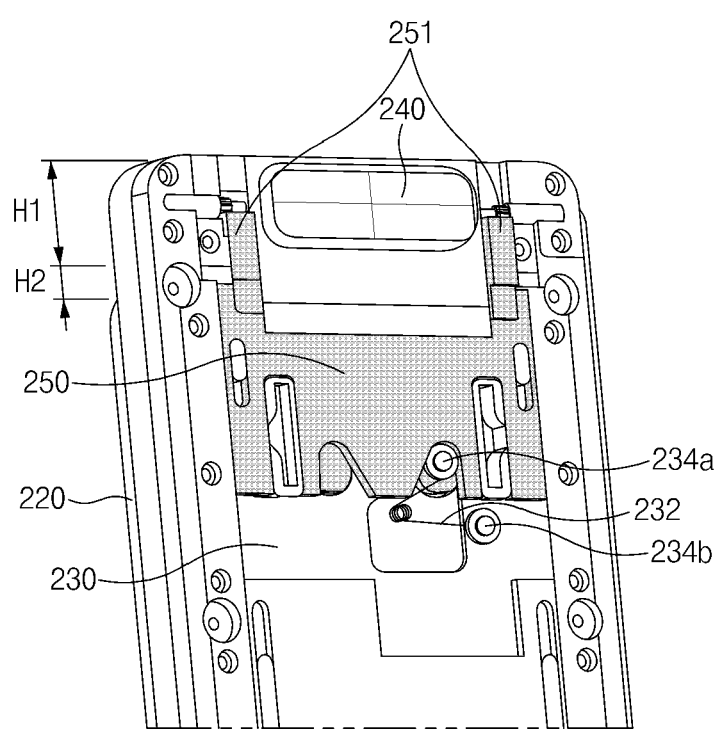
Figure 4C:
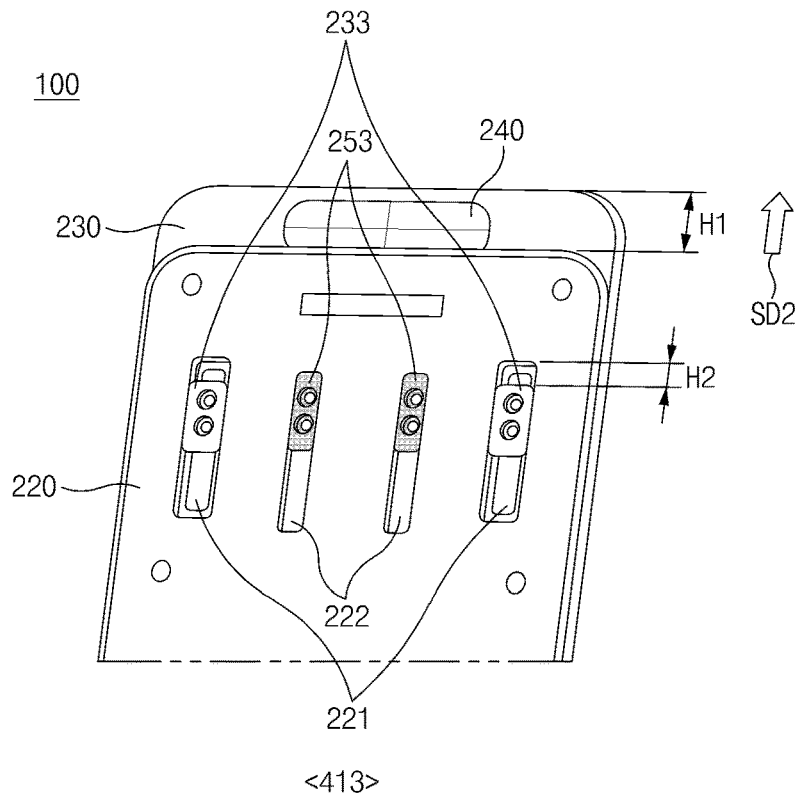
FIG. 4C is a diagram illustrating the interior of the electronic device based on the front part being located in the second position when performing the slide operation in the second slide direction according to an embodiment.
Figure 4C:
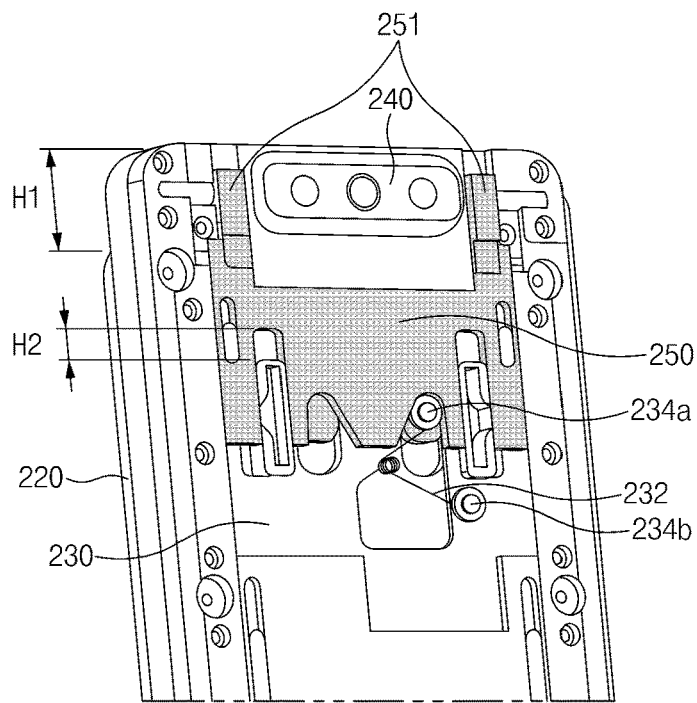
Figure 4D:
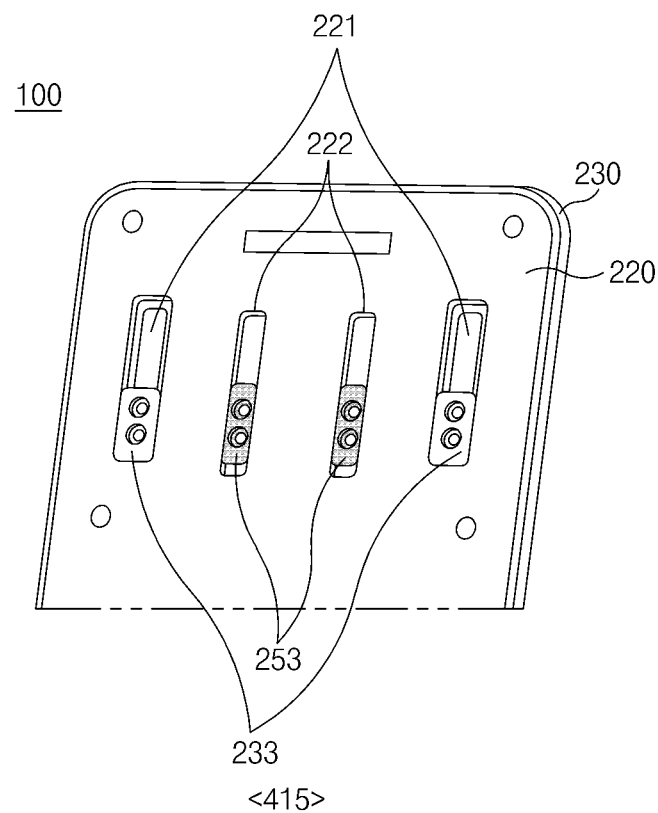
FIG. 4D is a diagram illustrating the interior of the electronic device based on the front part being located in the first position when performing the slide operation in the second slide direction according to an embodiment.
Figure 4D:
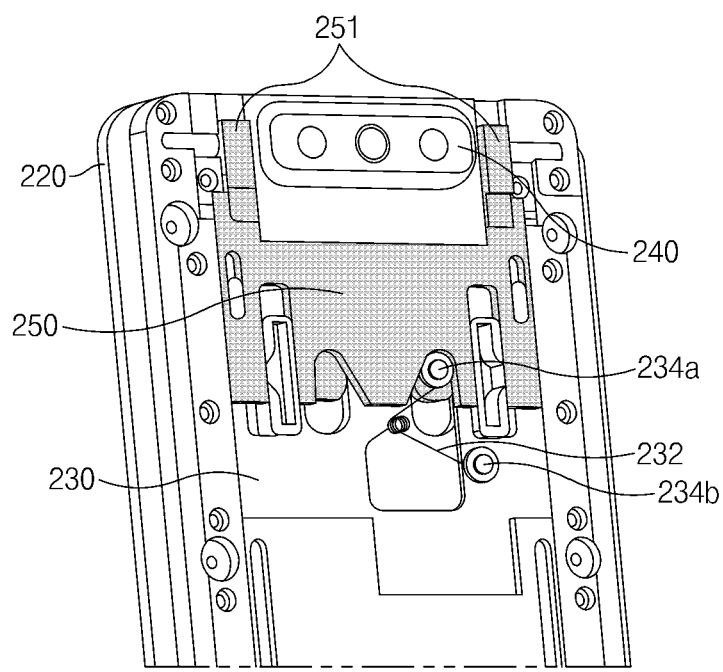

FIG. 4A is a diagram illustrating an example slide operation performed by the front part in a second slide direction SD2 (e.g., a direction in which the front part moves upward) according to an embodiment. FIG. 4B is a diagram illustrating the interior of the electronic device based on the front part being located in the third position when performing the slide operation in the second slide direction SD2 according to an embodiment. FIG. 4C is a diagram illustrating the interior of the electronic device based on the front part being located in the second position when performing the slide operation in the second slide direction SD2 according to an embodiment. FIG. 4D is a diagram illustrating the interior of the electronic device based on the front part being located in the first position when performing the slide operation in the second slide direction SD2 according to an embodiment.

Referring to FIG. 4A, the front part 201 of the electronic device 100 may perform the slide operation in the second slide direction SD2 through four steps 401, 402, 403, and 404. For example, in the fifth step 401, the front part 201 may be located in the third position (e.g., the position spaced apart from the upper end of the rear part 202 in the first slide direction SD1 by the distance obtained by adding the first distance H1 and the second distance H2) through the slide operation of FIG. 3A. In the fifth step 401, the camera included in the camera module 240 may face the second direction (e.g., the direction toward the front of the electronic device 100). In the sixth step 402, the front part 201 may slide from the third position to the second position (e.g., the position spaced apart from the third position by the second distance H2 in the second slide direction SD2). In the sixth step 402, the camera included in the camera module 240 may rotate in a second rotational direction SP2. In the seventh step 403, the front part 201 may be located in the second position. In the seventh step 403, the camera included in the camera module 240 may complete rotation and may face the first direction. In the eighth step 404, the front part 201 may return to the first position (e.g., the initial position). In the eighth step 404, the camera included in the camera module 240 may continue to maintain the first direction.

Referring to FIGS. 4B, 4C and 4D, 411, 413, and 415 are views of the first body 220 when viewed from the front of the electronic device 100, where the display (e.g., the display 210) is omitted. 412, 414, and 416 are views of the second body 230 when viewed from the rear of the electronic device 100, where the back cover (e.g., the back cover 260) is omitted.

According to an embodiment, in 411 and 412 (e.g., the fifth step 401), the first body 220 may be located in the third position (e.g., the position spaced apart from the upper end of the second body 230 in the first slide direction SD1 by the distance obtained by adding the first distance H1 and the second distance H2) through the slide operation of FIG. 3A. For example, the first guide member 233 may be located in the fifth guide position (e.g., the position aligned with the upper end of the first guide groove 221). The second guide member 253 may be located in the fourth guide position (e.g., the position aligned with the upper end of the second guide groove 222). The inner slide part 250 may be located in the second slide position. The support member 232 may maintain the second support state. The camera included in the camera module 240 may face the second direction (e.g., the direction toward the front of the electronic device 100).

According to an embodiment, in 413 and 414 (e.g., the sixth step 402 and the seventh step 403), the first body 220 may slide from the third position to the second position (e.g., the position spaced apart from the third position by the second distance H2 in the second slide direction SD2). For example, the first guide member 233 may move from the fifth guide position to the third guide position (e.g., the position spaced apart from the upper end of the first guide groove 221 by the second distance H2). The second guide member 253 may maintain the fourth guide position (e.g., the position aligned with the upper end of the second guide groove 222). For example, while the first body 220 slides from the third position to the second position, the second guide member 253 may be integrally moved with the first body 220 by the second distance H2. While the first body 220 slides from the third position to the second position, the inner slide part 250 may receive a specific force (e.g., an elastic force or a magnetic force) in the second slide direction SD2 by the support member 232. Accordingly, while the first body 220 slides from the third position to the second position, the inner slide part 250 (or the second guide member 253) may be integrally moved with the first body 220 by the second distance H2.

According to various embodiments, in 413 and 414, the inner slide part 250 may slide from the second slide position to the first slide position (e.g., the initial slide position) as the first body 220 slides from the third position to the second position. For example, when the inner slide part 250 slides from the second slide position to the first slide position, the rack gear 251 may move in the second slide direction SD2 by the second distance H2, and the double gear structure engaged with the rack gear 251 may rotate. Depending on the rotation of the double gear structure, the camera module 240 may rotate in the second rotational direction SP2. When the inner slide part 250 is located in the first slide position (e.g., when the first body 220 is located in the second position), the camera included in the camera module 240 may face the first direction (e.g., the direction away from the rear of the electronic device 100). According to various embodiments, the support member 232 may be changed from the second support state to the first support state (e.g., the initial support state) depending on a movement of the inner slide part 250.

According to an embodiment, in 415 and 416 (e.g., the eighth step 404), the first body 220 may return to the first position (e.g., the initial position). For example, the upper end of the first body 220 may be aligned with the upper end of the second body 230. The first guide member 233 may be located in the first guide position (e.g., the position aligned with the lower end of the first guide groove 221). The second guide member 253 may be located in the second guide position (e.g., the lower end portion of the second guide groove 222). The inner slide part 250 may maintain the first slide position. The camera included in the camera module 240 may maintain the first direction. According to various embodiments, the support member 232 may maintain the first support state.

According to the above-described embodiments of FIGS. 3A, 3B, 3C, 3D, 4A, 4B, 4C and 4D, the front part 201 of the electronic device 100 may slide from the first position to the third position in the state of facing the one surface of the rear part 202 and may return from the third position to the first position. When the front part 201 slides between the first position and the second position in the first slide direction SD1 or the second slide direction SD2, only the front part 201 may perform the slide operation, and the camera included in the camera module 240 may maintain the first direction. When the front part 201 slides between the second position and the third position in the first slide direction SD1 (or from the second position to the third position), the camera included in the camera module 240 may rotate toward the second direction from the first direction. When the front part 201 slides between the second position and the third position in the second slide direction SD2 (or from the third position to the second position), the camera included in the camera module 240 may rotate toward the first direction from the second direction. Accordingly, the electronic device 100 may use the one camera module 100 for both front and back photography, and the display (e.g., the display 210) may be disposed to use the entire front surface of the electronic device 100.

Figure 5:
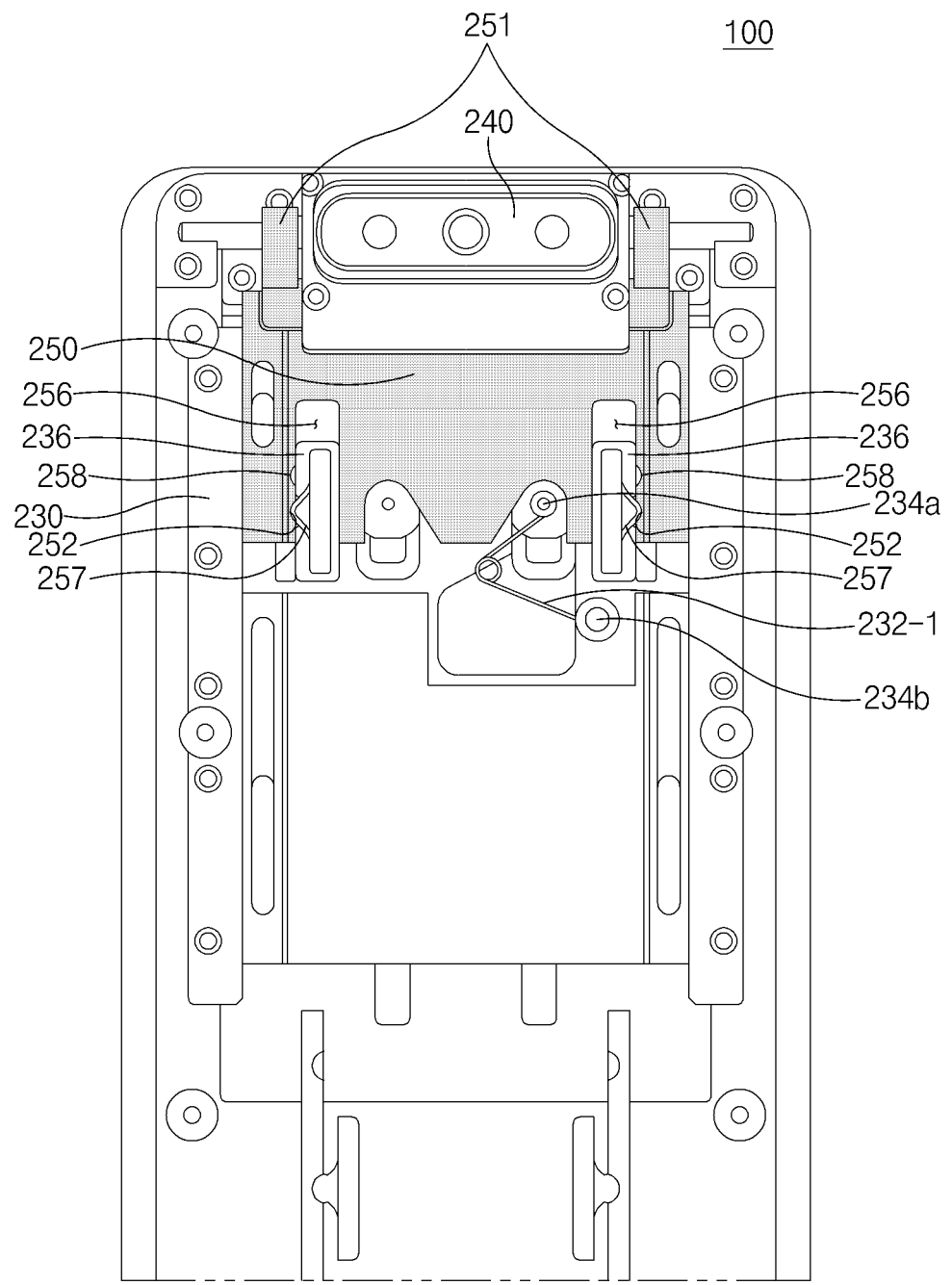
FIG. 5 is a diagram illustrating an example support member according to an embodiment.

FIG. 5 is a diagram illustrating an example support member according to an embodiment.

According to an embodiment, a support member 232-1 (e.g., the support member 232 of FIG. 2B) may include a torsion spring. The support member 232-1 may provide a restoring force to the inner slide part 250 when the inner slide part 250 returns from the second slide position to the first slide position. For example, one leg of the support member 232-1 may be fixed to the first fixing member 234a. The first fixing member 234a may be coupled to the inner slide part 250. The other leg of the support member 232-1 may be fixed to the second fixing member 234b. The second fixing member 234b may be coupled to the second body 230. Accordingly, when the first body 220 moves from the second position to the third position in FIG. 3D, the inner slide part 250 may integrally move with the first body 220, and when the inner slide part 250 moves from the first slide position to the second slide position separately from the second body 230, the support member 232-1 may be compressed from the first support state to the second support state. In the second support state, the support member 232-1 may apply an elastic force to the inner slide part 250. When the first body 220 moves from the third position to the second position in FIG. 4B, the inner slide part 250 may return from the second slide position to the first slide position through the elastic force by the support member 232-1.

According to an embodiment, the inner slide part 250 may be fixed in the first slide position or the second slide position. For example, the second body 230 may include a protruding member 236. The inner slide part 250 may include a groove 256 corresponding to the shape of the protruding member 236. The inner slide part 250 may move depending on a relative movement of the protruding member 236 and the groove 256. The protruding member 236 may include a stopping member 257 having elasticity. The groove 256 may include, on one side surface thereof, a first recessed portion 252 and a second recessed portion 258 that correspond to the shape of part of the stopping member 257. When the inner slide part 250 is located in the first slide position, the stopping member 257 may be fixed to the first recessed portion 252. When the inner slide part 250 is located in the second slide position, the stopping member 257 may be fixed to the second recessed portion 258. For example, the stopping member 257 may be implemented with a plate spring.

According to various embodiments, the stopping member 257 may implement a smooth movement of the inner slide part 250. For example, while the inner slide part 250 moves between the first slide position and the second slide position, the stopping member 257 may apply an elastic force to the inner slide part 250, and the inner slide part 250 may smoothly move between the first slide position and the second slide position based on the elastic force of the stopping member 257. The elastic force of the stopping member 257 may be less than the elastic force of the support member 232-1. Accordingly, when the first body 220 moves from the third position to the second position in FIG. 4B, the inner slide part 250 may return from the second slide position to the first slide position through the elastic force by the support member 232-1.

Figure 6:
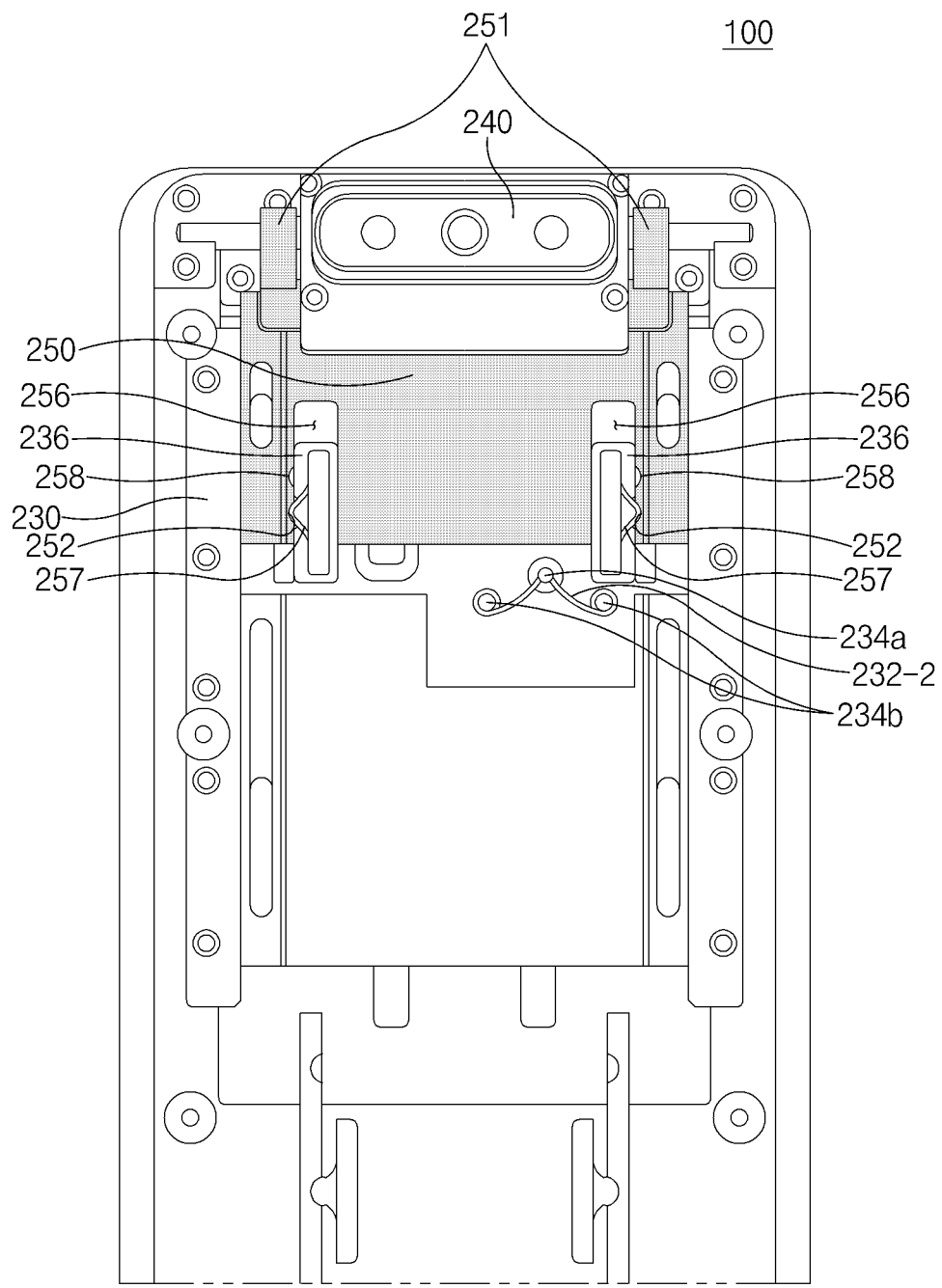
FIG. 6 is a view diagram an example support member according to an embodiment.

FIG. 6 is a diagram illustrating an example support member according to an embodiment.

According to an embodiment, a support member 232-2 (e.g., the support member 232 of FIG. 2B) may include a wire forming spring. The support member 232-2 may provide a restoring force to the inner slide part 250 when the inner slide part 250 returns from the second slide position to the first slide position. For example, one portion of the support member 232-2 may be fixed to the first fixing member 234a. The first fixing member 234a may be coupled to the inner slide part 250. Opposite ends of the support member 232-2 may be fixed to at least one second fixing member 234b. The second fixing member 234b may be coupled to the second body 230. Accordingly, when the first body 220 moves from the second position to the third position in FIG. 3D, the inner slide part 250 may integrally move with the first body 220, and when the inner slide part 250 moves from the first slide position to the second slide position separately from the second body 230, the support member 232-2 may be compressed from the first support state to the second support state. In the second support state, the support member 232-2 may apply an elastic force to the inner slide part 250. When the first body 220 moves from the third position to the second position in FIG. 4B, the inner slide part 250 may return from the second slide position to the first slide position through the elastic force by the support member 232-2.

According to an embodiment, the inner slide part 250 may be fixed in the first slide position or the second slide position. For example, the second body 230 may include the protruding member 236. The inner slide part 250 may include the groove 256 corresponding to the shape of the protruding member 236. The inner slide part 250 may move depending on a relative movement of the protruding member 236 and the groove 256. The protruding member 236 may include the stopping member 257 having elasticity. The groove 256 may include, on one side surface thereof, the first recessed portion 252 and the second recessed portion 258 that correspond to the shape of part of the stopping member 257. When the inner slide part 250 is located in the first slide position, the stopping member 257 may be fixed to the first recessed portion 252. When the inner slide part 250 is located in the second slide position, the stopping member 257 may be fixed to the second recessed portion 258. For example, the stopping member 257 may be implemented with a plate spring.

According to various embodiments, the stopping member 257 may implement a smooth movement of the inner slide part 250. For example, while the inner slide part 250 moves between the first slide position and the second slide position, the stopping member 257 may apply an elastic force to the inner slide part 250, and the inner slide part 250 may smoothly move between the first slide position and the second slide position based on the elastic force of the stopping member 257. The elastic force of the stopping member 257 may be less than the elastic force of the support member 232-2. Accordingly, when the first body 220 moves from the third position to the second position in FIG. 4B, the inner slide part 250 may return from the second slide position to the first slide position through the elastic force by the support member 232-2.

Figure 7:
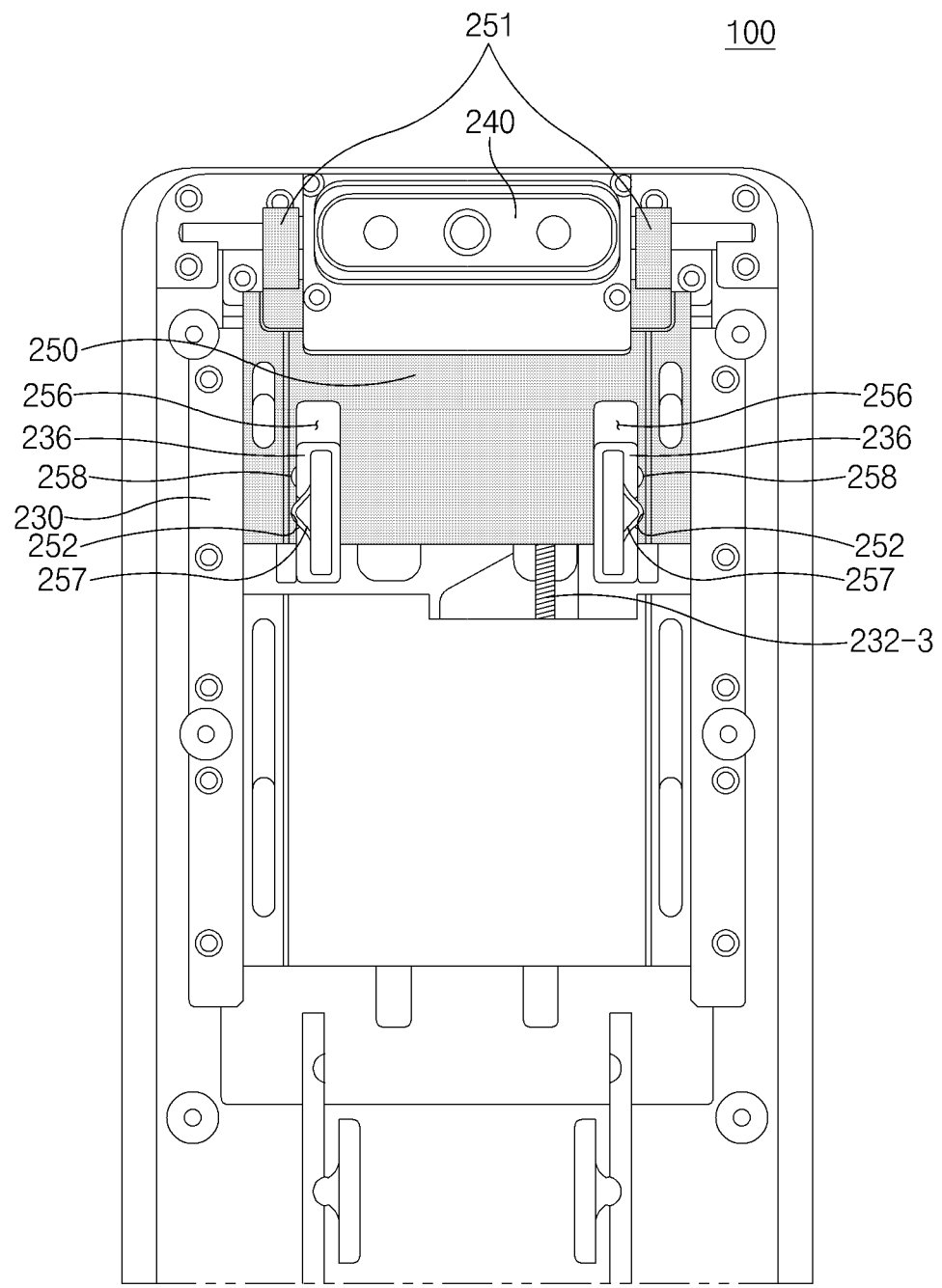
FIG. 7 is a diagram illustrating an example support member according to an embodiment.

FIG. 7 is a diagram illustrating an example support member according to an embodiment.

According to an embodiment, a support member 232-3 (e.g., the support member 232 of FIG. 2B) may include a compression spring. The support member 232-3 may provide a restoring force to the inner slide part 250 when the inner slide part 250 returns from the second slide position to the first slide position. For example, one end of the support member 232-3 may be coupled to a lower end of the inner slide part 250. An opposite end of the support member 232-3 may be coupled to part of the second body 230. Accordingly, when the first body 220 moves from the second position to the third position in FIG. 3D, the inner slide part 250 may integrally move with the first body 220, and when the inner slide part 250 moves from the first slide position to the second slide position separately from the second body 230, the support member 232-3 may be compressed from the first support state to the second support state. In the second support state, the support member 232-3 may apply an elastic force to the inner slide part 250. When the first body 220 moves from the third position to the second position in FIG. 4B, the inner slide part 250 may return from the second slide position to the first slide position through the elastic force by the support member 232-3.

According to an embodiment, the inner slide part 250 may be fixed in the first slide position or the second slide position. For example, the second body 230 may include the protruding member 236. The inner slide part 250 may include the groove 256 corresponding to the shape of the protruding member 236. The inner slide part 250 may move depending on a relative movement of the protruding member 236 and the groove 256. The protruding member 236 may include the stopping member 257 having elasticity. The groove 256 may include, on one side surface thereof, the first recessed portion 252 and the second recessed portion 258 that correspond to the shape of part of the stopping member 257. When the inner slide part 250 is located in the first slide position, the stopping member 257 may be fixed to the first recessed portion 252. When the inner slide part 250 is located in the second slide position, the stopping member 257 may be fixed to the second recessed portion 258. For example, the stopping member 257 may be implemented with a plate spring.

According to various embodiments, the stopping member 257 may implement a smooth movement of the inner slide part 250. For example, while the inner slide part 250 moves between the first slide position and the second slide position, the stopping member 257 may apply an elastic force to the inner slide part 250, and the inner slide part 250 may smoothly move between the first slide position and the second slide position based on the elastic force of the stopping member 257. The elastic force of the stopping member 257 may be less than the elastic force of the support member 232-3. Accordingly, when the first body 220 moves from the third position to the second position in FIG. 4B, the inner slide part 250 may return from the second slide position to the first slide position through the elastic force by the support member 232-3.

Figure 8:
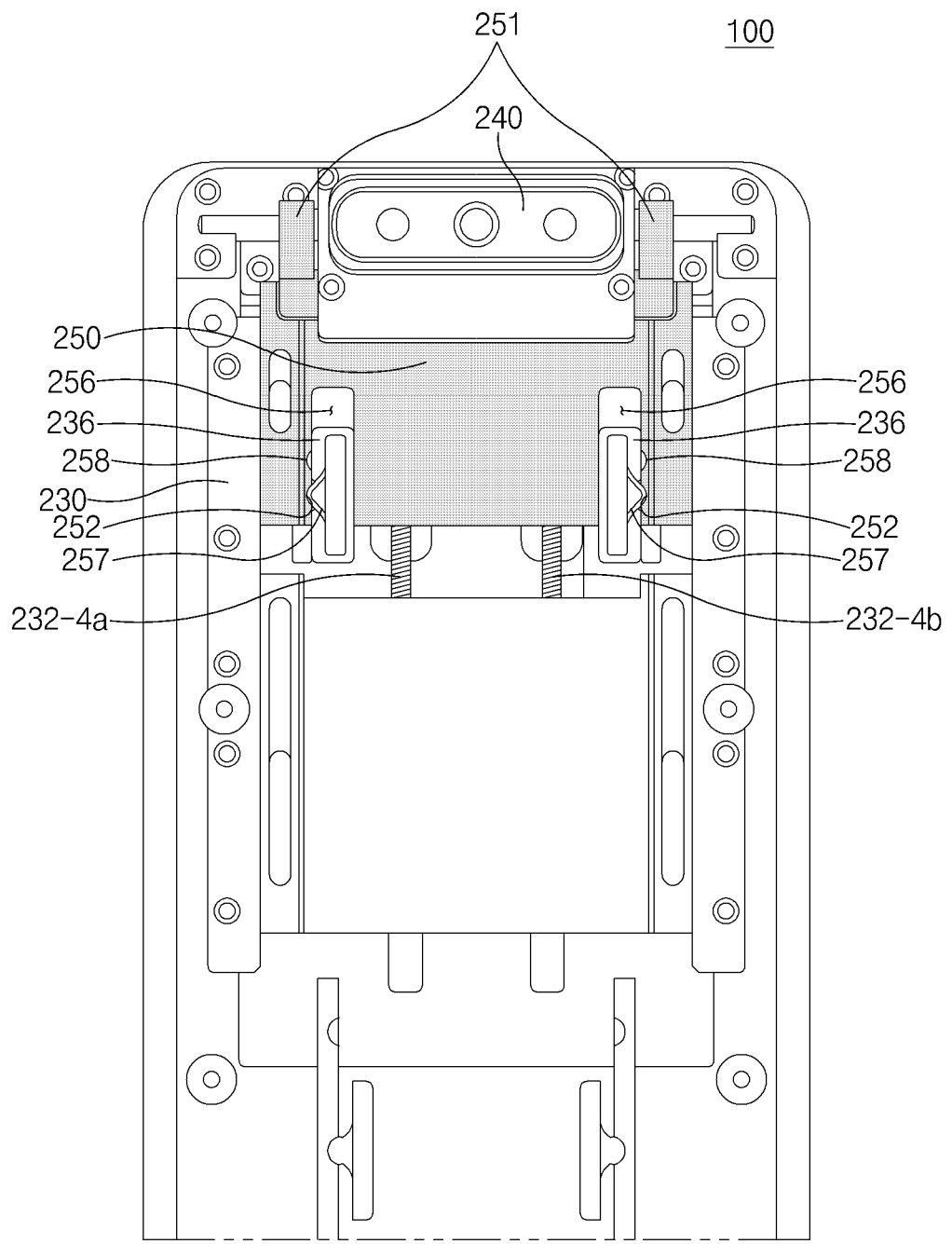
FIG. 8 is a diagram illustrating an example support member according to an embodiment.

FIG. 8 is a diagram illustrating an example support member according to an embodiment.

According to an embodiment, the electronic device 100 may use a plurality of support members 232-4a and 232-4b (e.g., the support member 232 of FIG. 2B). For example, the support members 232-4a and 232-4b may each include a compression spring. The support members 232-4a and 232-4b may provide a restoring force to the inner slide part 250 when the inner slide part 250 returns from the second slide position to the first slide position. The support members 232-4a and 232-4b may be coupled, at one end thereof, to the lower end of the inner slide part 250. The support members 232-4a and 232-4b may be coupled, at an opposite end thereof, to part of the second body 230. Accordingly, when the first body 220 moves from the second position to the third position in FIG. 3D, the inner slide part 250 may integrally move with the first body 220, and when the inner slide part 250 moves from the first slide position to the second slide position separately from the second body 230, the support members 232-4a and 232-4b may be compressed from the first support state to the second support state. In the second support state, the support members 232-4a and 232-4b may apply elastic forces to the inner slide part 250. When the first body 220 moves from the third position to the second position in FIG. 4B, the inner slide part 250 may return from the second slide position to the first slide position through the elastic forces by the support members 232-4a and 232-4b. According to various embodiments, the support members 232-4a and 232-4b may be symmetrically disposed on the lower end of the inner slide part 250. Accordingly, the support members 232-4a and 232-4b may uniformly apply an elastic force to the lower end of the inner slide part 250.

According to an embodiment, the inner slide part 250 may be fixed in the first slide position or the second slide position. For example, the second body 230 may include the protruding member 236. The inner slide part 250 may include the groove 256 corresponding to the shape of the protruding member 236. The inner slide part 250 may move depending on a relative movement of the protruding member 236 and the groove 256. The protruding member 236 may include the stopping member 257 having elasticity. The groove 256 may include, on one side surface thereof, the first recessed portion 252 and the second recessed portion 258 that correspond to the shape of part of the stopping member 257. When the inner slide part 250 is located in the first slide position, the stopping member 257 may be fixed to the first recessed portion 252. When the inner slide part 250 is located in the second slide position, the stopping member 257 may be fixed to the second recessed portion 258. For example, the stopping member 257 may be implemented with a plate spring.

According to various embodiments, the stopping member 257 may implement a smooth movement of the inner slide part 250. For example, while the inner slide part 250 moves between the first slide position and the second slide position, the stopping member 257 may apply an elastic force to the inner slide part 250, and the inner slide part 250 may smoothly move between the first slide position and the second slide position based on the elastic force of the stopping member 257. The elastic force of the stopping member 257 may be less than the elastic forces of the support member 232-4a and 232-4b. Accordingly, when the first body 220 moves from the third position to the second position in FIG. 4B, the inner slide part 250 may return from the second slide position to the first slide position through the elastic forces by the support members 232-4a and 232-4b.

Figure 9:
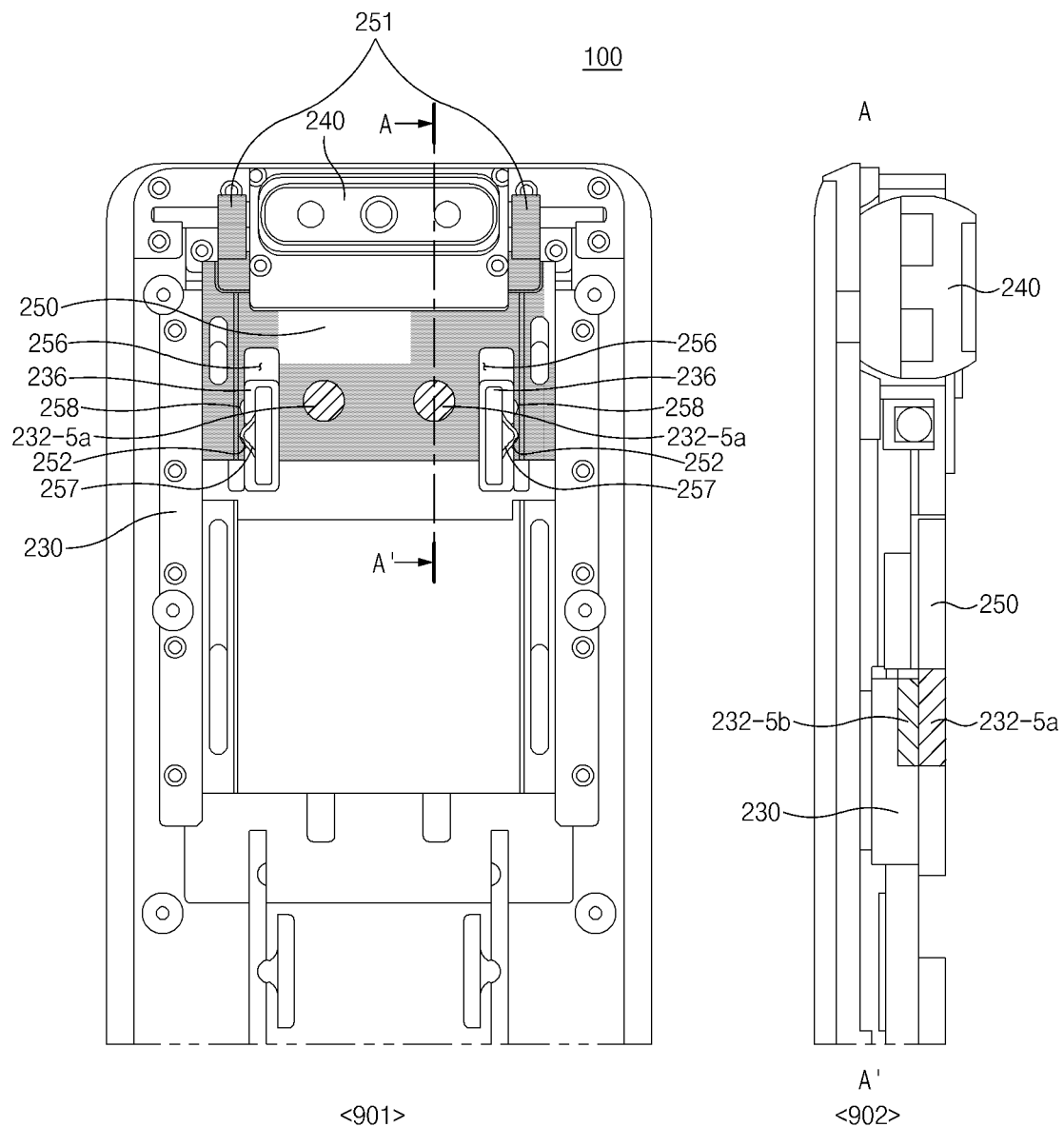
FIG. 9 is a diagram illustrating an example support member according to an embodiment.

FIG. 9 is a diagram illustrating an example support member according to an embodiment. Referring to FIG. 9, 902 is a sectional view taken along line A-A' in 901.

According to an embodiment, support members 232-5a and 232-5b (e.g., the support member 232 of FIG. 2B) may include a magnetic body. The support members 232-5a and 232-5b may provide a restoring force to the inner slide part 250 when the inner slide part 250 returns from the second slide position to the first slide position. For example, the first support member 232-5a may be coupled to the inner slide part 250. The second support member 232-5b may be coupled to the second body 230. The first support member 232-5a and the second support member 232-5b may have different polarities (e.g., a case where the first support member 232-5a has a North pole and the second support member 232-5b has a South pole, or a case where the first support member 232-5a has a South pole and the second support member 232-5b has a North pole). In an embodiment, in the first support state, the first support member 232-5a and the second support member 232-5b may be arranged to overlap each other. Accordingly, when the first body 220 moves from the second position to the third position in FIG. 3D, the inner slide part 250 may integrally move with the first body 220, and when the inner slide part 250 moves from the first slide position to the second slide position separately from the second body 230, the first support member 232-5*a* may be moved from the first support state to the second support state. When the second support member 232-5*b* maintains the first support state and the first support member 232-5*a* is changed to the second support state, the inner slide part 250 may receive a restoring force in the second slide direction SD2 due to a magnetic force between the first support member 232-5*a* and the second support member 232-5*b* (e.g., an attractive force between the first support member 232-5*a* and the second support member 232-5*b*). When the first body 220 moves from the third position to the second position in FIG. 4B, the inner slide part 250 may return from the second slide position to the first slide position through the magnetic force between the first support member 232-5*a* and the second support member 232-5*b*.

According to various embodiments, the first support member 232-5*a* and the second support member 232-5*b* may be disposed in a plurality of pairs, and the plurality of pairs may be symmetrically disposed with respect to the central axis of the inner slide part 250. Accordingly, the plurality of pairs may uniformly apply a magnetic force to the inner slide part 250.

According to an embodiment, the inner slide part 250 may be fixed in the first slide position or the second slide position. For example, the second body 230 may include the protruding member 236. The inner slide part 250 may include the groove 256 corresponding to the shape of the protruding member 236. The inner slide part 250 may move depending on a relative movement of the protruding member 236 and the groove 256. The protruding member 236 may include the stopping member 257 having elasticity. The groove 256 may include, on one side surface thereof, the first recessed portion 252 and the second recessed portion 258 that correspond to the shape of part of the stopping member 257. When the inner slide part 250 is located in the first slide position, the stopping member 257 may be fixed to the first recessed portion 252. When the inner slide part 250 is located in the second slide position, the stopping member 257 may be fixed to the second recessed portion 258. For example, the stopping member 257 may be implemented with a plate spring.

According to various embodiments, the stopping member 257 may implement a smooth movement of the inner slide part 250. For example, while the inner slide part 250 moves between the first slide position and the second slide position, the stopping member 257 may apply an elastic force to the inner slide part 250, and the inner slide part 250 may smoothly move between the first slide position and the second slide position based on the elastic force of the stopping member 257. The elastic force of the stopping member 257 may be less than the magnetic force between the first support member 232-5*a* and the second support member 232-5*b*. Accordingly, when the first body 220 moves from the third position to the second position in FIG. 4B, the inner slide part 250 may return from the second slide position to the first slide position through the magnetic force between the first support member 232-5*a* and the second support member 232-5*b*.

Figure 10:
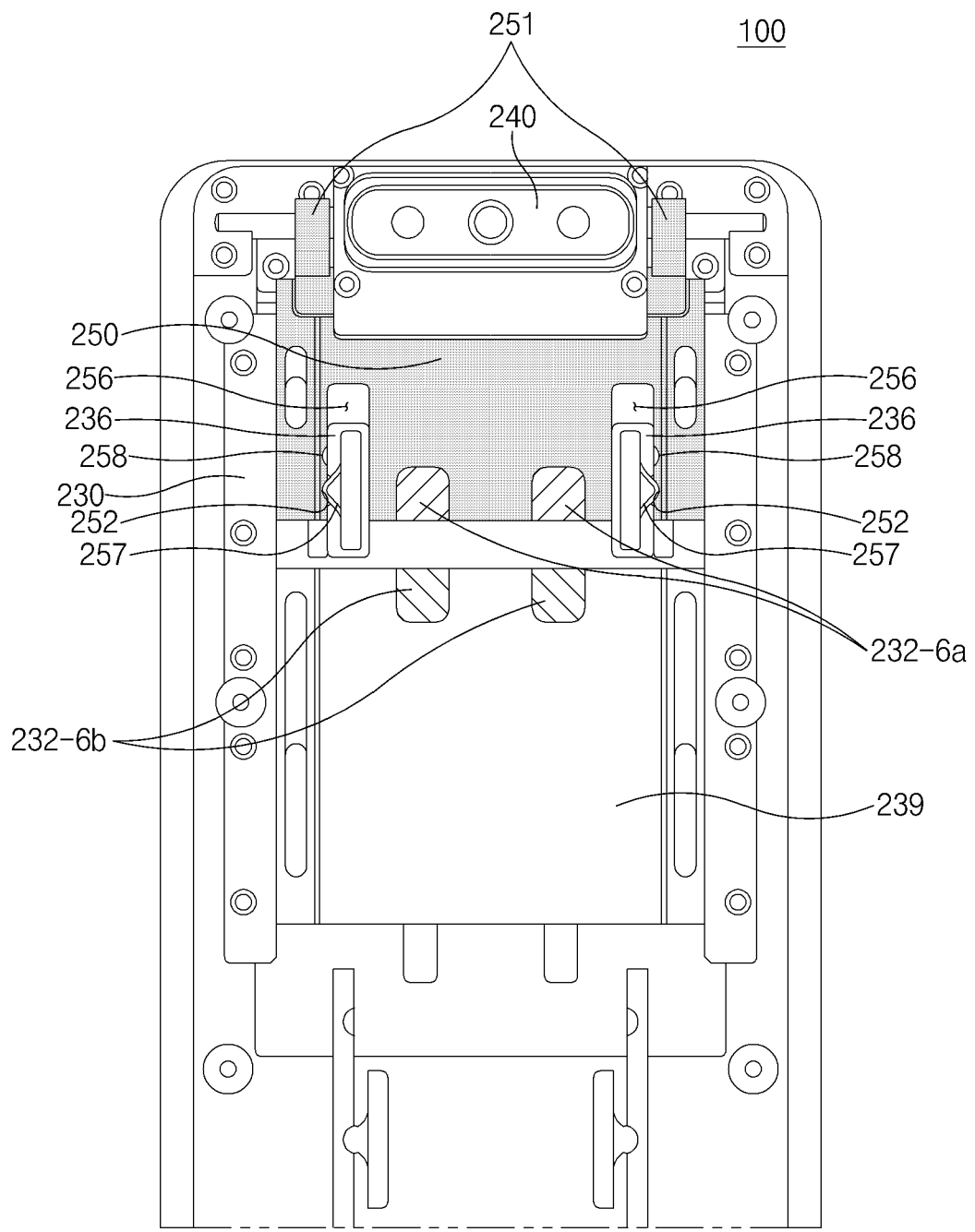
FIG. 10 is a diagram illustrating an example support member according to an embodiment.

FIG. 10 is a diagram illustrating an example support member according to an embodiment.

According to an embodiment, support members 232-6*a* and 232-6*b* (e.g., the support member 232 of FIG. 2B) may include a magnetic body. The support members 232-6*a* and 232-6*b* may provide a restoring force to the inner slide part 250 when the inner slide part 250 returns from the second slide position to the first slide position. For example, the first support member 232-6*a* may be coupled to the inner slide part 250. The second support member 232-6*b* may be coupled to a portion 239 of the second body 230. The first support member 232-6*a* and the second support member 232-6*b* may have the same polarity (e.g., a case where the first support member 232-6*a* has a North pole and the second support member 232-6*b* has a North pole, or a case where the first support member 232-6*a* has a South pole and the second support member 232-6*b* has a South pole). In an embodiment, in the first support state, the first support member 232-6*a* and the second support member 232-6*b* may be separated from each other. When the inner slide part 250 moves from the first slide position to the second slide position, the first support member 232-6*a* may be moved close to the second support member 232-6*b*. When the first support member 232-6*a* and the second support member 232-6*b* are close to each other, the inner slide part 250 may receive a restoring force in the second slide direction SD2 due to a magnetic force between the first support member 232-6*a* and the second support member 232-6*b* (e.g., a repulsive force between the first support member 232-6*a* and the second support member 232-6*b*). When the first body 220 moves from the third position to the second position in FIG. 4B, the inner slide part 250 may return from the second slide position to the first slide position through the magnetic force between the first support member 232-6*a* and the second support member 232-6*b*.

According to various embodiments, the first support member 232-6*a* and the second support member 232-6*b* may be disposed in a plurality of pairs, and the plurality of pairs may be symmetrically disposed with respect to the central axis of the inner slide part 250. Accordingly, the plurality of pairs may uniformly apply a magnetic force to the inner slide part 250.

According to an embodiment, the inner slide part 250 may be fixed in the first slide position or the second slide position. For example, the second body 230 may include the protruding member 236. The inner slide part 250 may include the groove 256 corresponding to the shape of the protruding member 236. The inner slide part 250 may move depending on a relative movement of the protruding member 236 and the groove 256. The protruding member 236 may include the stopping member 257 having elasticity. The groove 256 may include, on one side surface thereof, the first recessed portion 252 and the second recessed portion 258 that correspond to the shape of part of the stopping member 257. When the inner slide part 250 is located in the first slide position, the stopping member 257 may be fixed to the first recessed portion 252. When the inner slide part 250 is located in the second slide position, the stopping member 257 may be fixed to the second recessed portion 258. For example, the stopping member 257 may be implemented with a plate spring.

According to various embodiments, the stopping member 257 may implement a smooth movement of the inner slide part 250. For example, while the inner slide part 250 moves between the first slide position and the second slide position, the stopping member 257 may apply an elastic force to the inner slide part 250, and the inner slide part 250 may smoothly move between the first slide position and the second slide position based on the elastic force of the stopping member 257. The elastic force of the stopping member 257 may be less than the magnetic force between the first support member 232-6*a* and the second support member 232-6*b*. Accordingly, when the first body 220 moves from the third position to the second position in FIG. 4B, the inner slide part 250 may return from the second slide position to the first slide position through the magnetic force between the first support member 232-6a and the second support member 232-6b.

Figure 11A:
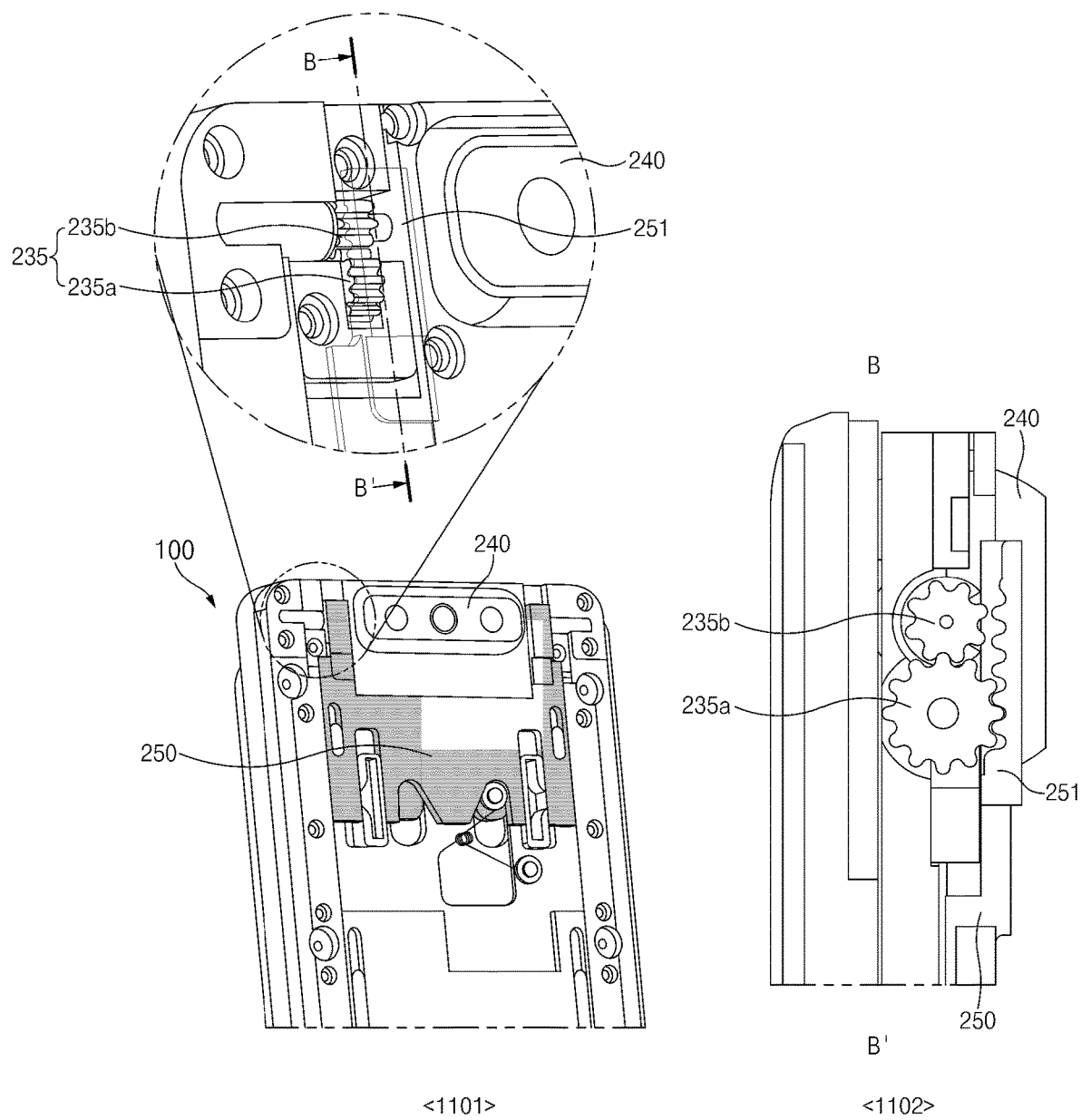
FIG. 11A is a diagram illustrating an example double gear structure for controlling rotation of a camera module according to an embodiment.
Figure 11B:
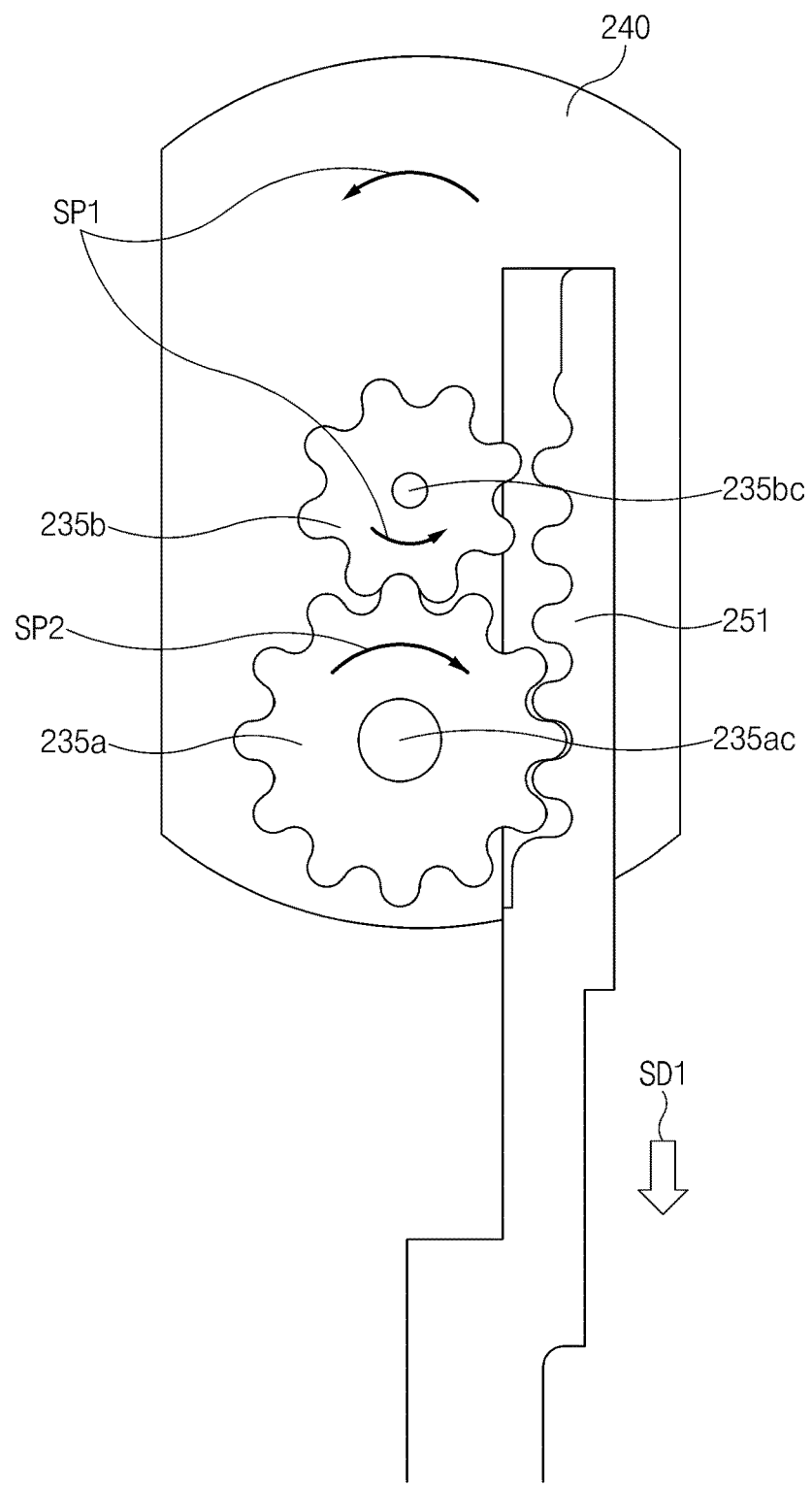
FIG. 11B is a diagram illustrating one example showing an operation of the double gear structure based on the camera module of FIG. 11A rotating toward the front from the rear of the electronic device (e.g., a first rotational direction)
Figure 11C:
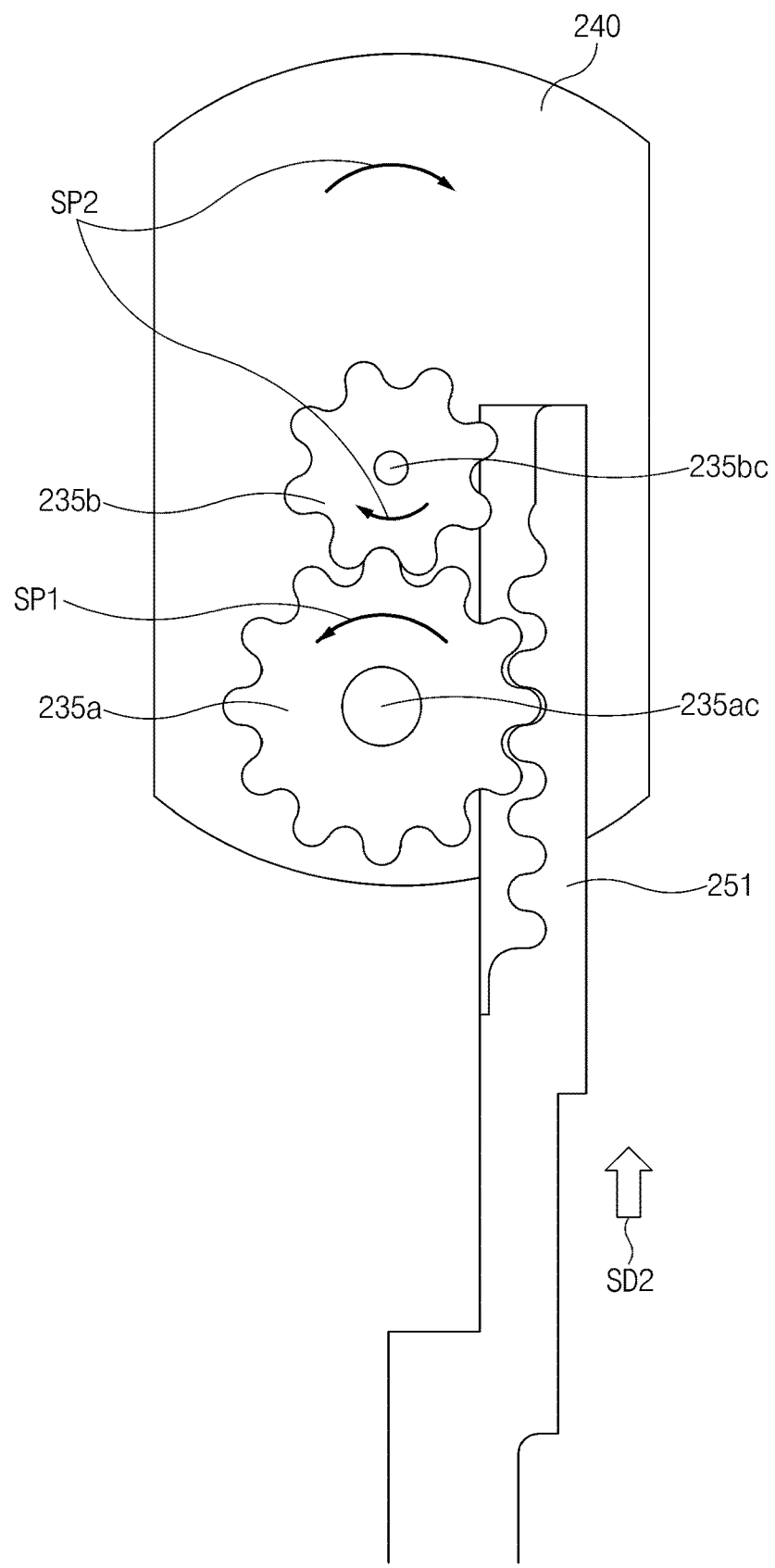
FIG. 11C is a diagram illustrating an example operation of the double gear structure based on the camera module of FIG. 11A rotating toward the rear from the front of the electronic device (e.g., a second rotational direction)

FIG. 11A is a diagram illustrating an example double gear structure for controlling rotation of the camera module according to an embodiment. FIG. 11B is a diagram illustrating an example operation of the double gear structure when the camera module of FIG. 11A rotates toward the front from the rear of the electronic device (e.g., the first rotational direction). FIG. 11C is a diagram illustrating an example operation of the double gear structure when the camera module of FIG. 11A rotates toward the rear from the front of the electronic device (e.g., the second rotational direction).

Referring to FIGS. 11A, 11B and 11C, the electronic device 100 may include at least one double gear structure 235. For example, the double gear structure 235 may be disposed on opposite sides of the camera module 240.

According to an embodiment, the double gear structure 235 may include a plurality of pinion gears. For example, the double gear structure 235 may include a first pinion gear 235a and a second pinion gear 235b. The first pinion gear 235a may rotate by being engaged with the rack gear 251 of the inner slide part 250. The second pinion gear 235b may rotate by being engaged with the first pinion gear 235a and may not be connected to the rack gear 251. Accordingly, the first pinion gear 235a may rotate depending on linear motion of the rack gear 251, and the second pinion gear 235b may rotate in the opposite direction to that in which the first pinion gear 235a rotates. The camera module 240 may be connected to a rotary shaft of the second pinion gear 235b and may rotate in the same direction as the second pinion gear 235b. According to various embodiments, the radius of rotation of the camera module 240 may be determined depending on the length of the rack gear 251, the gear ratio between the rack gear 251 and the first pinion gear 235a, or the gear ratio between the first pinion gear 235a and the second pinion gear 235b.

According to an embodiment, referring to FIG. 11B, as in the third step 303 of FIG. 3A, the rack gear 251 may move the second distance H2 in the first slide direction SD1 when the inner slide part 250 slides in the first slide direction SD1 by the second distance H2. The first pinion gear 235a may rotate in the second rotational direction SP2 when the rack gear 251 moves the second distance H2 in the first slide direction SD1. At this time, if the camera module 240 is connected to a rotary shaft of the first pinion gear 235a and rotates in the second rotational direction SP2, the camera module 240 may be at risk for colliding with the front part 201. When the first pinion gear 235a rotates in the second rotational direction SP2 about the rotary shaft 235ac of the first pinion gear 235a, the second pinion gear 235b may rotate in the first rotational direction SP1. Accordingly, the camera module 240 connected to the rotary shaft of the second pinion gear 235b may rotate in the first rotational direction SP1, and a collision between the camera module 240 and the front part 201 may be prevented.

According to an embodiment, referring to FIG. 11C, as in the sixth step 402 of FIG. 4A, the rack gear 251 may move the second distance H2 in the second slide direction SD2 when the inner slide part 250 slides in the second slide direction SD2 by the second distance H2. The first pinion gear 235a may rotate in the first rotational direction SP1 when the rack gear 251 moves the second distance H2 in the second slide direction SD2. At this time, if the camera module 240 is connected to the rotary shaft of the first pinion gear 235a and rotates in the first rotational direction SP1 about the rotary shaft 235ac of the first pinion gear 235a, the camera module 240 may be at risk for colliding with the front part 201. When the first pinion gear 235a rotates in the first rotational direction SP1, the second pinion gear 235b may rotate in the second rotational direction SP2. Accordingly, the camera module 240 connected to the rotary shaft of the second pinion gear 235b may rotate in the second rotational direction SP2, and a collision between the camera module 240 and the front part 201 may be prevented.

Figure 12:
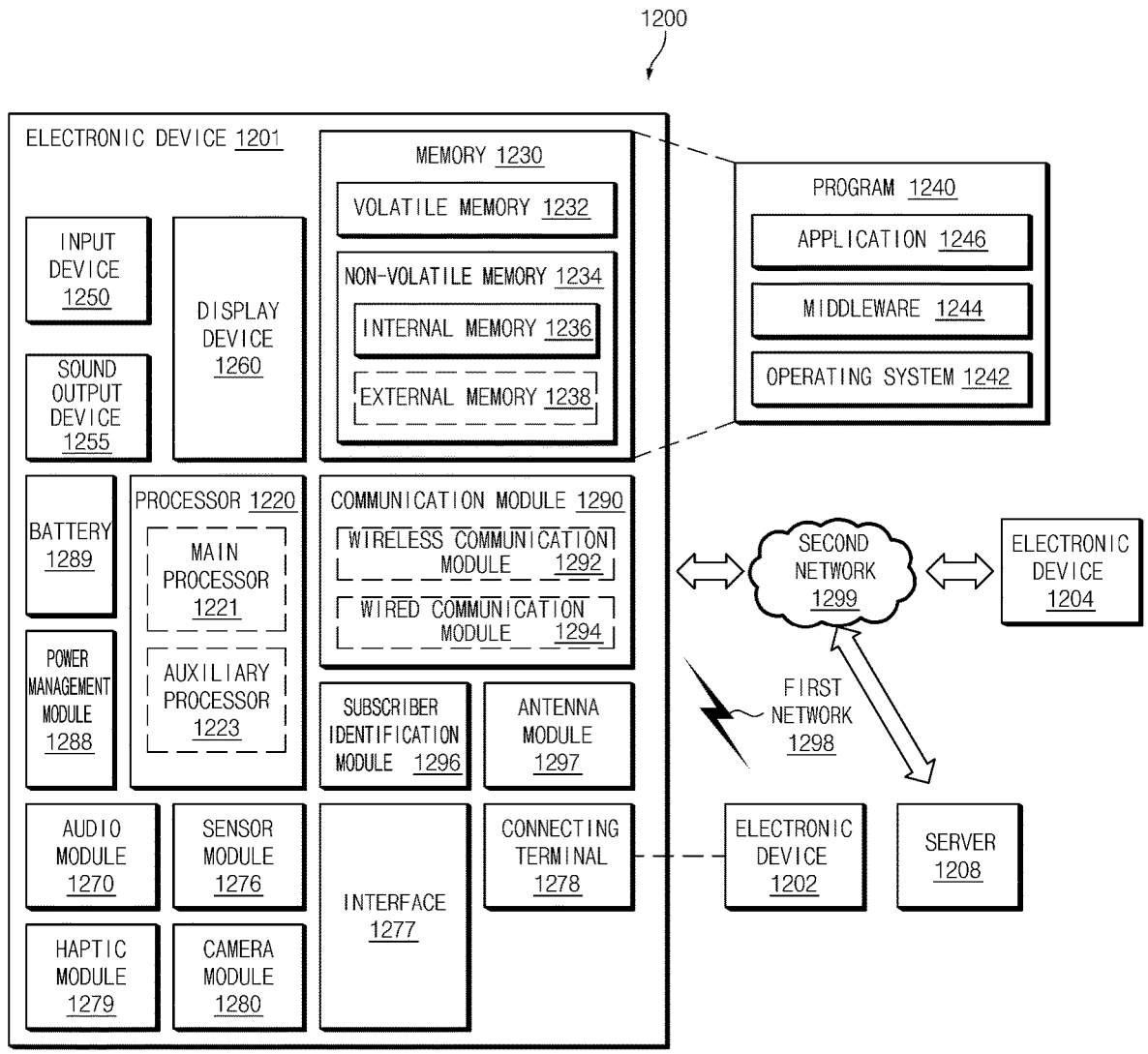
FIG. 12 is a block diagram illustrating an example electronic device in a network environment according to various embodiments.

FIG. 12 is a block diagram illustrating an example electronic device 1201 in a network environment 1200 according to various embodiments. Referring to FIG. 12, the electronic device 1201 in the network environment 1200 may communicate with an electronic device 1202 via a first network 1298 (e.g., a short-range wireless communication network), or an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, memory 1230, an input device 1250, a sound output device 1255, a display device 1260, an audio module 1270, a sensor module 1276, an interface 1277, a haptic module 1279, a camera module 1280, a power management module 1288, a battery 1289, a communication module 1290, a subscriber identification module (SIM) 1296, or an antenna module 1297. In some embodiments, at least one (e.g., the display device 1260 or the camera module 1280) of the components may be omitted from the electronic device 1201, or one or more other components may be added in the electronic device 1201. In some embodiments, some of the components may be implemented as single integrated circuitry. For example, the sensor module 1276 (e.g., a fingerprint sensor, an iris sensor, or an illuminance sensor) may be implemented as embedded in the display device 1260 (e.g., a display).

The processor 1220 may execute, for example, software (e.g., a program 1240) to control at least one other component (e.g., a hardware or software component) of the electronic device 1201 coupled with the processor 1220, and may perform various data processing or computation. According to an example embodiment, as at least part of the data processing or computation, the processor 1220 may load a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), and an auxiliary processor 1223 (e.g., a graphics processing unit (GPU), an image signal processor (ISP), a sensor hub processor, or a communication processor (CP)) that is operable independently from, or in conjunction with, the main processor 1221. Additionally or alternatively, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display device 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input device 1250 may receive a command or data to be used by other component (e.g., the processor 1220) of the electronic device 1201, from the outside (e.g., a user) of the electronic device 1201. The input device 1250 may include, for example, a microphone, a mouse, a keyboard, or a digital pen (e.g., a stylus pen).

The sound output device 1255 may output sound signals to the outside of the electronic device 1201. The sound output device 1255 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1260 may visually provide information to the outside (e.g., a user) of the electronic device 1201. The display device 1260 may include, for example, a display, a hologram device, or a projector and control circuitry to control a corresponding one of the display, hologram device, and projector. According to an embodiment, the display device 1260 may include touch circuitry adapted to detect a touch, or sensor circuitry (e.g., a pressure sensor) adapted to measure the intensity of force incurred by the touch.

The audio module 1270 may convert a sound into an electrical signal and vice versa. According to an embodiment, the audio module 1270 may obtain the sound via the input device 1250, or output the sound via the sound output device 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to an example embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The antenna module 1297 may transmit or receive a signal or power to or from the outside (e.g., the external electronic device) of the electronic device 1201. According to an embodiment, the antenna module 1297 may include an antenna including a radiating element including a conductive material or a conductive pattern formed in or on a substrate (e.g., PCB). According to an embodiment, the antenna module 1297 may include a plurality of antennas. In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the electronic devices 1202 and 1204 may be a device of a same type as, or a different type, from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various example embodiments of the disclosure, one camera module may be used as a front camera and a rear camera, and thus the display of the electronic device may be expanded to a maximum and/or increased size.

While the disclosure has been illustrated and described with reference to various example embodiments thereof, it will be understood that the various example embodiments are intended to be illustrative, not limiting. It will be further understood by those skilled in the art that various changes in form and details may be made therein without departing from the true spirit and full scope of the disclosure, including the appended claims and their equivalents.

What is claimed is:

1. An electronic device comprising:
a front part including a display;
a rear part disposed to face a rear surface of the front part, the rear part including an opening, at least portion of the opening being exposed in a direction opposite to a front surface of the front part;
a camera module including at least one camera disposed in the opening and configured to rotate based on a slide operation of the front part;
a first fixing member coupled to an inner slide part; and
a second fixing member coupled to a portion of the rear part,
wherein the front part is configured to slide between a first position in which the front part and the rear part are aligned with each other, a second position in which part of the opening is exposed in a direction toward the front surface of the front part, and a third position in which the opening is exposed in the direction toward the front surface of the front part,
wherein the rear part includes:
the inner slide configured to integrally move with the front part based on the front part moving between the second position and the third position; and
a support configured to apply a specified force to the inner slide based on the front part moving between the second position and the third position, and
wherein the camera module is configured to:
face a direction away from the rear surface of the front part based on the front part being in the first position; and
face the direction toward the front surface of the front part based on the front part being in the third position,
wherein a leg of the support is connected to the first fixing member, and another leg of the support is connected to the second fixing member, and
wherein the support is configured to be compressed based on the front part moving from the second position to the third position.

2. The electronic device of claim 1, wherein the camera module is configured to face the direction away from the rear surface of the front part without rotation based on the front part sliding between the first position and the second position.

3. The electronic device of claim 1, wherein the camera module is configured to rotate from the direction away from the rear surface of the front part to the direction toward the front surface of the front part based on the front part sliding from the second position to the third position.

4. The electronic device of claim 1, wherein the camera module is configured to rotate from the direction toward the front surface of the front part to the direction away from the rear surface of the front part based on the front part sliding from the third position to the second position.

5. The electronic device of claim 1, wherein the front part is configured to move alone between the first position and the second position irrespective of the inner slide, and
wherein the inner slide is configured to be moved by the front part by a distance between the second position and the third position based on the front part moving from the second position to the third position.

6. The electronic device of claim 5, wherein based on the front part moving from the third position to the second position, the inner slide is configured to be moved by the support, based on the specified force.

7. The electronic device of claim 1, wherein the inner slide is configured to slide in the rear part independently of the rear part by a distance between the second position and the third position.

8. The electronic device of claim 1, wherein the front part is configured to slide from the rear part by an external force provided from the outside.

9. The electronic device of claim 1, wherein the support includes at least one of a torsion spring, or a wire forming spring, and
wherein the support is configured to apply a restoring force by elasticity to the inner slide based on the front part being in the third position.

10. An electronic device comprising:
a front part including a display;
a rear part disposed to face a rear surface of the front part, the rear part including an opening, at least portion of the opening being exposed in a direction opposite to a front surface of the front part; and
a camera module including at least one camera disposed in the opening and configured to rotate based on a slide operation of the front part,
wherein the front part is configured to slide between a first position in which the front part and the rear part are aligned with each other, a second position in which part of the opening is exposed in a direction toward the front surface of the front part, and a third position in which the opening is exposed in the direction toward the front surface of the front part,
wherein the rear part includes:
an inner slide configured to integrally move with the front part based on the front part moving between the second position and the third position; and
a support configured to apply a specified force to the inner slide based on the front part moving between the second position and the third position,
wherein the camera module is configured to:
face a direction away from the rear surface of the front part based on the front part being in the first position; and face the direction toward the front surface of the front part based on the front part being in the third position, wherein one end of the support is fixed to a portion of the inner slide, and an opposite end of the support is fixed to a portion of the rear part, and wherein the support is configured to be compressed based on the front part moving from the second position to the third position.

11. An electronic device comprising:

a front part including a display;

a rear part disposed to face a rear surface of the front part, the rear part including an opening, at least portion of the opening being exposed in a direction opposite to a front surface of the front part; and a camera module including at least one camera disposed in the opening and configured to rotate based on a slide operation of the front part, wherein the front part is configured to slide between a first position in which the front part and the rear part are aligned with each other, a second position in which part of the opening is exposed in a direction toward the front surface of the front part, and a third position in which the opening is exposed in the direction toward the front surface of the front part, wherein the rear part includes:

an inner slide configured to integrally move with the front part based on the front part moving between the second position and the third position; and a support configured to apply a specified force to the inner slide based on the front part moving between the second position and the third position, wherein the camera module is configured to:

face a direction away from the rear surface of the front part based on the front part being in the first position; and face the direction toward the front surface of the front part based on the front part being in the third position, wherein the support includes a first magnetic body and a second magnetic body having different polarities, and wherein the support is configured to apply a restoring force by magnetism to the inner slide part based on the front part being in the third position.

12. The electronic device of claim 11, wherein the first magnetic body is included in the inner slide, wherein the second magnetic body is included in the rear part, and wherein the first magnetic body and the second magnetic body are vertically aligned based on the front part being in the first position or the second position.

13. The electronic device of claim 12, wherein based on the front part being in the third position, the first magnetic body and the second magnetic body are spaced apart from each other by a specific distance to configure the first and second magnetic bodies to apply an attractive force by magnetism to the inner slide.

14. The electronic device of claim 1, wherein the inner slide includes a rack gear, wherein the rear part includes:

a first pinion gear configured to rotate by being engaged with the rack gear; and a second pinion gear configured to rotate by being engaged with the first pinion gear, and wherein the camera module is connected to a rotary shaft of the second pinion gear and is configured to rotate in the same direction as the second pinion gear.

15. The electronic device of claim 14, wherein a radius of rotation of the camera module is based on a length of the rack gear, a gear ratio between the rack gear and the first pinion gear, or a gear ratio between the first pinion gear and the second pinion gear.

16. The electronic device of claim 1, wherein the front part includes a first guide groove and a second guide groove, wherein the rear part includes a first guide configured to move along the first guide groove, and wherein the inner slide includes a second guide configured to move along the second guide groove.

17. The electronic device of claim 16, wherein based on the front part being in the first position, the first guide is positioned in a lower end of the first guide groove, and the second guide is positioned in a lower end of the second guide groove.

18. The electronic device of claim 17, wherein based on the front part being in the second position spaced apart from the first position by a first distance, the first guide is in a position spaced apart from an upper end of the first guide groove by a second distance, and the first guide is positioned in an upper end of the second guide groove.

19. The electronic device of claim 18, wherein based on the front part moving from the second position to the third position spaced apart from the second position by the second distance, the first guide is configured to move the second distance in the first guide groove, and the second guide is configured to integrally move the second distance with the front part.

20. The electronic device of claim 10, wherein the support includes a compression spring, and wherein the support is configured to apply a restoring force by elasticity to the inner slide based at least on the front part being in the third position.

* * * * *